United States Patent [19]

Erdman

[11] Patent Number: 4,459,519

[45] Date of Patent: Jul. 10, 1984

[54] ELECTRONICALLY COMMUTATED MOTOR SYSTEMS AND CONTROL THEREFOR

[75] Inventor: David M. Erdman, Fort Wayne, Ind.

[73] Assignee: General Electric Company, Fort Wayne, Ind.

[21] Appl. No.: 191,056

[22] Filed: Sep. 25, 1980

Related U.S. Application Data

[63] Continuation of Ser. No. 943,490, Sep. 18, 1978, abandoned, which is a continuation-in-part of Ser. No. 802,484, Jun. 1, 1977, , which is a continuation-in-part of Ser. No. 729,761, Oct. 5, 1976, , which is a continuation-in-part of Ser. No. 482,409, Jun. 24, 1974, Pat. No. 4,005,347.

[51] Int. Cl.³ .............................................. H02K 23/00
[52] U.S. Cl. ........................................ 318/254; 318/3; 318/334
[58] Field of Search ........................ 62/208, 209, 180; 318/3, 4, 5, 138, 254, 305, 334

[56] References Cited

U.S. PATENT DOCUMENTS

| | | | |
|---|---|---|---|
| 3,165,685 | 1/1965 | Manteuffel et al. | 318/138 |
| 3,274,471 | 9/1966 | Moczala | 318/138 |
| 3,304,481 | 2/1967 | Saussele | 318/138 |
| 3,329,852 | 7/1967 | Saussele et al. | 318/138 |
| 3,353,076 | 11/1967 | Haines | 318/138 |
| 3,359,474 | 12/1967 | Welch et al. | 318/138 |
| 3,384,801 | 5/1968 | Rodgers | 318/334 |
| 3,475,668 | 10/1969 | Mieslinger | 318/138 |
| 3,488,566 | 1/1970 | Fukuda | 318/138 |
| 3,531,702 | 9/1970 | Hill | 318/138 |
| 3,577,053 | 5/1971 | McGee | 318/254 |
| 3,581,173 | 5/1971 | Hood et al. | 318/254 |
| 3,603,161 | 9/1971 | Schwarz | 74/5.6 |
| 3,603,869 | 9/1971 | Neuffer et al. | 322/31 |
| 3,611,081 | 10/1971 | Watson | 318/138 |
| 3,633,084 | 1/1972 | Rakes | 318/254 |
| 3,634,873 | 1/1972 | Nishimura | 318/254 |
| 3,663,878 | 5/1972 | Miyasaka | 318/254 |
| 3,780,363 | 12/1973 | Doemen et al. | 318/254 |
| 3,783,357 | 1/1974 | Ichiyanage | 318/138 |
| 3,794,895 | 2/1974 | Coupin et al. | 318/254 |
| 3,803,863 | 4/1974 | Jednacz et al. | 62/209 |
| 3,806,785 | 4/1974 | DeValroger et al. | 318/254 |
| 3,829,749 | 8/1974 | Richt | 318/331 |
| 3,875,463 | 4/1975 | Reuter et al. | 317/13 R |
| 3,877,243 | 4/1975 | Kramer | 62/180 |
| 3,906,320 | 9/1975 | Doemen | 318/331 |
| 3,932,793 | 1/1976 | Muller | 318/138 |
| 3,938,014 | 2/1976 | Nakajima | 318/138 |
| 3,942,083 | 3/1976 | Takahashi et al. | 318/138 |
| 3,969,658 | 7/1976 | Htsui | 318/202 |
| 3,986,086 | 10/1976 | Muller | 318/138 |
| 3,997,823 | 12/1976 | Machida | 318/138 |
| 4,004,202 | 1/1977 | Davis | 318/138 |
| 4,015,182 | 3/1977 | Erdman | 318/334 |
| 4,024,725 | 5/1977 | Uchida et al. | 62/209 |
| 4,025,835 | 5/1977 | Wada | 318/254 |
| 4,027,215 | 5/1977 | Knight et al. | 318/341 |
| 4,030,005 | 6/1977 | Doemen | 318/138 |
| 4,102,150 | 7/1978 | Kountz | 62/209 |

FOREIGN PATENT DOCUMENTS

| | | |
|---|---|---|
| 1610045 | 8/1974 | Fed. Rep. of Germany . |
| 2164685 | 5/1975 | Fed. Rep. of Germany . |
| 1374991 | 9/1964 | France . |
| 1405208 | 5/1965 | France . |
| 2239796 | 2/1975 | France . |
| 2269232 | 11/1975 | France . |
| 2276723 | 1/1976 | France . |
| 7414197 | 5/1975 | Netherlands . |

*Primary Examiner*—Ulysses Weldon
*Attorney, Agent, or Firm*—Joseph E. Papin

[57] ABSTRACT

Electronically commutated motor and control arrangements particularly adapted for use with refrigeration systems and methods of operating refrigeration systems are disclosed. In one form, a fan control means is provided for responding to temperature of a compartment being cooled by a refrigeration system; comparing the compartment temperature with a desired temperature; and varying the speed of an evaporator fan, thereby varying the movement of refrigerated air across an evaporator and into the compartment. A regulating circuit is provided for maintaining the evaporator at a reference temperature by controlling the output signal of an alternator which supplies energization power to winding stages of a brushless DC motor. By varying the energization level of the winding stages, a compressor, which is coupled to the motor, is caused to vary the flow rate of refrigerant through the evaporator so as to maintain the evaporator at the reference temperature. The regulating circuit includes means for responding to a signal from the fan control means, which is indicative of the fan speed and relative compartment cooling demand, for changing the reference temperature for the evaporator thereby to cause variance in the temperature of air moved about the evaporator by the fan for controlling temperature within the compartment. The regulating circuit also includes: means for limiting and controlling motor winding current to a maximum value; means for limiting motor speed to a predetermined low value; means for limiting and controlling motor speed to a maximum high value; means for assuring a minimum energization level for the motor winding stages; means for limiting the energization level of the winding stages to a maximum voltage value; and means for inhibiting motor operation if the evaporator temperature is less than a predetermined low temperature value.

11 Claims, 13 Drawing Figures

ELECTRONICALLY COMMUTATED MOTOR SYSTEMS AND CONTROL THEREFOR

CROSS REFERENCE TO RELATED APPLICATION

This is a continuation, of application Ser. No. 943,490, filed Sept. 18, 1978 now abandoned which is a continuation-in-part of my co-pending application Ser. No. 802,484 filed June 1, 1977 which is a continuation-in-part of my then co-pending application Ser. No. 729,761 filed Oct. 5, 1976 which in turn was a continuation-in-part of my then co-pending application Ser. No. 482,409 filed June 24, 1974 which issued as U.S. Patent No. 4,005,347 for "Electronically Commutated Motor and Method of Making the Same" assigned to the assignee of the present invention. This application is related to the commonly assigned application of Floyd H. Wright, Ser. No. 729,804 which was filed on Oct. 5, 1976. The entire disclosures of the last mentioned application and my application Ser. No. 802,484, my application Ser. No. 729,761, my application Ser. No. 482,409 as well as my application Ser. No. 482,407 of June 24, 1974 which issued as U.S. Pat. No. 4,015,182 are incorporated herein by reference.

BACKGROUND OF THE INVENTION

This invention relates generally to rotating dynamoelectric machines and, more particularly, to such machines that receive power from a direct current or rectified alternating current power supply and that utilize electronic commutation means. More specifically, the present invention relates to electronically commutated motors and control for use with refrigeration systems and which may be particularly adapted for cooling passenger compartments of vehicles.

As discussed in my prior U.S. Pat. No. 4,015,182, many air conditioning systems employ a vehicle engine for driving a compressor through a suitable belt and pulley interconnection arrangement; thus, the amount of cooling acquired from the air conditioning system is directly tied to the engine operating speed. Therefore, the air conditioning system is generally sized to acquire the desired amount of cooling at low speeds or idle speeds of the vehicle which results in an air conditioning system which is much larger than is necessary to cool the passenger compartment at the normal operating speeds of the vehicle. Further, the compressor represents an added load to the engine causing a decrease in engine output power and a significant reduction in gas mileage.

In such prior art air conditioning systems, the excess cooling obtained when the vehicle is operating at normal running speeds may be controlled by cycling a compressor in an "on and off" manner, in accordance with temperature. This on and off cycling may be accomplished by periodically engaging and disengaging a mechanical connection, for example, a clutch connected between the engine and the compressor. However, such on and off type operation of the compressor causes a substantial strain on the mechanical components interconnecting the vehicle engine and compressor, and can cause substantial variance in engine speed which is particularly noticeable in vehicles having smaller sized engines.

In an attempt to eliminate on and off cycling of a compressor in a vehicular air conditioning system, some prior art systems have included a by-pass arrangement whereby excess cooling capacity is negated by allowing refrigerant to by-pass the evaporator so as to acquire a modulated cooling system rather than an on and off cycling system. However, such systems may be subjected to very high pressure differentials, thus increasing the likelihood of refrigerant leakage. Other prior art systems have attempted to compensate for excess cooling capacity within the air conditioning system by heating the cooling air being moved into the passenger compartment. As is readily apparent, such modulated control approaches and systems are very inefficient in that energy is being expended by the vehicle in creating the cooling capacity within the air conditioning system and then such energy is being wasted by either by-passing the evaporator or heating the air before movement into the passenger compartment.

In my prior U.S. Pat. No. 4,015,182, I disclosed, among other things, an air conditioning system employing an electronically commutated motor which eliminated and/or minimized many of the problems discussed hereinabove. For example, an air conditioning system employing an electronically commutated motor was disclosed which eliminated mechanical interconnections between the compressor and the engine of the vehicle so that the compressor speed was not dependent on the operating speed of the vehicle engine. Therefore, in addition to eliminating many of the mechanical problems associated with such interconnections, the disclosed arrangement allows design of a cooling system independent of engine speed considerations, and therefore, eliminates the need for drastic and wasteful oversizing of a cooling system. In another aspect of my prior patent, I disclosed an arrangement for controlling a refrigertion system so as to maintain a compartment at a desired operating temperature. The arrangement involves, among other things, controlling the amount of cooling of a refrigeration system by varying the energization level of stator windings in an electronically commutated motor.

However, it would be desirable to develop an improved electronically commutated motor and control arrangement for use with a refrigeration system which would improve temperature control within the compartment being cooled, improve operating life of system components, and at the same time, improve operating efficiency for the system. Temperature within a compartment can be controlled by cycling a compressor and its driving motor in an on-off manner, but to acquire relatively accurate control, the compressor and motor must be cycled quite often to keep the temperature within a narrow control span. However, frequent starting and stopping tends to decrease the operating life of the system. Each start-up of a brushless DC motor causes relatively high currents to be fed to the motor windings, thereby causing heating of electrical power driving components and the motor itself, and also, causing greater power losses within the motor windings. Further, it is believed that an energy loss of as much as 10–15% may occur when a compressor is cycled on and off at particular cycle rates. This significant energy loss is believed to be due to the migration of liquid refrigerant to ineffective cooling locations within the refrigeration system. For example, liquid refrigerant may migrate, during the off condition of the compressor, to locations beyond the evaporator, and upon subsequent restart of the compressor, the liquid refrigerant vaporizes outside the evaporator where no cooling effect is acquired as a result of such vaporization. Thus, it would be desirable to develop a control arrangement whereby the temperature within a compartment could be more accurately controlled and whereby the refrigeration system could be continuously modulated or controlled.

Still further, it would be desirable to develop an electronically commutated motor and control arrangement for use with a refrigeration system which would be responsive to different cooling demands within a compartment being cooled by the system. In a refrigeration system utilized to cool the passenger compartment of a vehicle, the compressor is typically operated to maintain a predetermined temperature at a location on an evaporator of the system. However, cooling demands upon such systems vary drastically. For example, if the vehicle has been parked in the hot sun, a great degree of cooling is desired to quickly bring the passenger compartment temperature to a comfortable level. Therefore, it would be desirable to develop a control arrangemnet which would automatically respond to varying cooling demands within the passenger compartment for automatically varying the degree of cooling of the system.

Furthermore, refrigeration systems in which a compressor is driven by an electric motor often have a lubricating pump arrangement for lubricating bearings of the motor. However, many of these pumping arragements are only effective at certain operating speeds of a motor; thus, it would be desirable to develop a control arrangement which would assure proper lubrication of motor bearings.

Moreover, it would be desirable to develop an electronically commutated motor and control arrangement for use with a refrigeration system which would be responsive to common failures or abnormal conditions within the system such as, for example, loss of refrigerant charge, a faulty temperature sensing element and/or evaporator freeze-up, and which would control motor operation when such failures occur so as to prevent damage to the motor and its power circuitry.

Accordingly, it is a general object of the present invention to develop new and improved brushless DC motor and control arrangements for use with refrigeration systems.

More specifically, an object of the present invention is to develop new and improved brushless DC motor and control arrangements which are particularly adaptable for controlling vehicular air conditioning systems.

Another object of the present invention is to develop new and improved electronically commutated motor and control arrangements for use with refrigeration systems which provide improved temperature control within compartments being cooled and which improve the operating efficiencies of the systems.

Still another object of the present invention is to develop new and improved control arrangements which are responsive to different cooling demands of compartments being cooled by refrigeration systems and which automatically vary the degree of cooling of the systems in accordance with such demands.

Yet another object of the present invention is to provide new and improved electronically commutated motor and control arrangements which control motor operating speed so as to assure proper lubrication of bearings of the motors.

A further object of the present invention is to provide new and improved electronically commutated motor and control arrangements for use with refrigeration systems which are responsive to common failures or abnormal conditions within the systems for controlling motor operation so as to prevent damage to the motors and their power circuitry.

A still further object of the present invention is to provide new and improved methods of operating refrigeration systems utilizing electronically commutated motors which improve temperature control within compartments being cooled and which improve operating efficiencies of the systems.

Yet a further object of the present invention is to provide new and improved methods of operating refrigeration systems utilizing electronically commutated motors which prevent damage to the motors and their circuitry when failures or abnormal conditions occur within the system.

SUMMARY OF THE INVENTION

In general, a brushless DC motor and control arrangement therefor is provided for use with a refrigeration system. The refrigeration system has an evaporator, a compressor for moving a refrigerant through the evaporator, and an evaporator fan for moving air about the evaporator for maintaining a desired temperature within a compartment by moving refrigerated air thereto. The brushless DC motor is coupled to the compressor and comprises a stationary armature having a core and winding means arranged to establish at least two winding stages. The winding means comprise concentric winding turns accommodated by the core and arranged to establish a predetermined number of magnetic poles, and the winding turns of each winding stage have a number of sets of axially extending conductor portions with such number equal to the predetermined number of magnetic poles. The axially extending conductor portions within each given set thereof being disposed in the armature to conduct current instantaneously in a common axial direction along the core thereby contributing to establishment of a magnetic pole when the winding stage containing such given set is energized. A rotor has constant magnetic polar regions equal in number to the predetermined number of poles, and the rotor is adapted to rotate in response to the magnetic poles established by the winding turns. A commutation circuit is provided for energizing the windings in a predetermined manner, and the commutation circuit has a detector circuit for sensing a back emf signal indicative of the back emf condition of at least one winding. Position determining circuit means is responsive to the emf signal from the detector circuit for integrating the emf signal to a predetermined value of volt-seconds whereupon the position determining circuit means produces a simulated relative position output signal, and means is responsive to the simulated relative position output signal from the position determining circuit means for supplying an output signal for energizing a selected one of the winding stages. The control arrangement further has a regulating means adapted for controlling the supply of energization power to the winding stages. The regulating means comprises means for responding to evaporator temperature and for varying the supply of power to the winding stages to thereby vary the speed of the brushless DC motor and control the flow rate of the refrigerant so as to maintain a selected portion of the evaporator at a first preselected reference temperature, and means for responding to a signal indicative of cooling demand within the compartment for automatically changing the first reference temperature of the selected portion of the evaporator in accordance with the relative cooling demand thereby to cause variance in the temperature of air moved about the evaporator for controlling temperature within the compartment.

Also in general, a method is provided in one form of the invention for controlling a refrigeration system. The refrigeration system has an evaporator, a compressor for circulating refrigerant through the evaporator, and an evaporator fan for moving air about the evaporator to maintain a desired temperature within a compartment. A brushless DC motor is coupled to the compressor and has a core with a longitudinal axis and at least two winding stages disposed on the core for producing magnetic fields. A rotor is adapted to rotate about the longitudinal axis in response to the magnetic fields produced by the winding stages, and a commutation circuit is provided for sensing the position of the rotor and selectively switching a power source to selectively energize the winding stages in accordance with the relative position of the rotor and winding stages. In practicing this method, temperature of the compartment being cooled by the system is sensed. The temperature is compared with a desired compartment temperature, and operating speed of the evaporator fan is varied in accordance with the difference between the sensed temperature and the desired temperature. The evaporator temperature is sensed, and the evaporator temperature is compared with a reference temperature. The power source output is controlled in accordance with the difference between the evaporator temperature and the reference temperature, thereby varying the speed of the brushless DC motor whereby the flow rate of refrigerant moved through the evaporator is varied to control operating temperature of the evaporator, and the reference temperature for the evaporator is automatically varied in accordance with a signal indicative of the evaporator fan speed, thereby changing the temperature of the air being moved by the fan for facilitating control of the compartment temperature at the desired temperature.

BRIEF DESCRIPTION OF THE DRAWINGS

Other objects of the present invention and their attendant advantages will become readily apparent from the following description taken in conjunction with the accompanying figures in which like reference characters are used to describe like parts throughout the several views.

DESCRIPTION OF THE PREFERRED EMBODIMENTS

Figure 1:
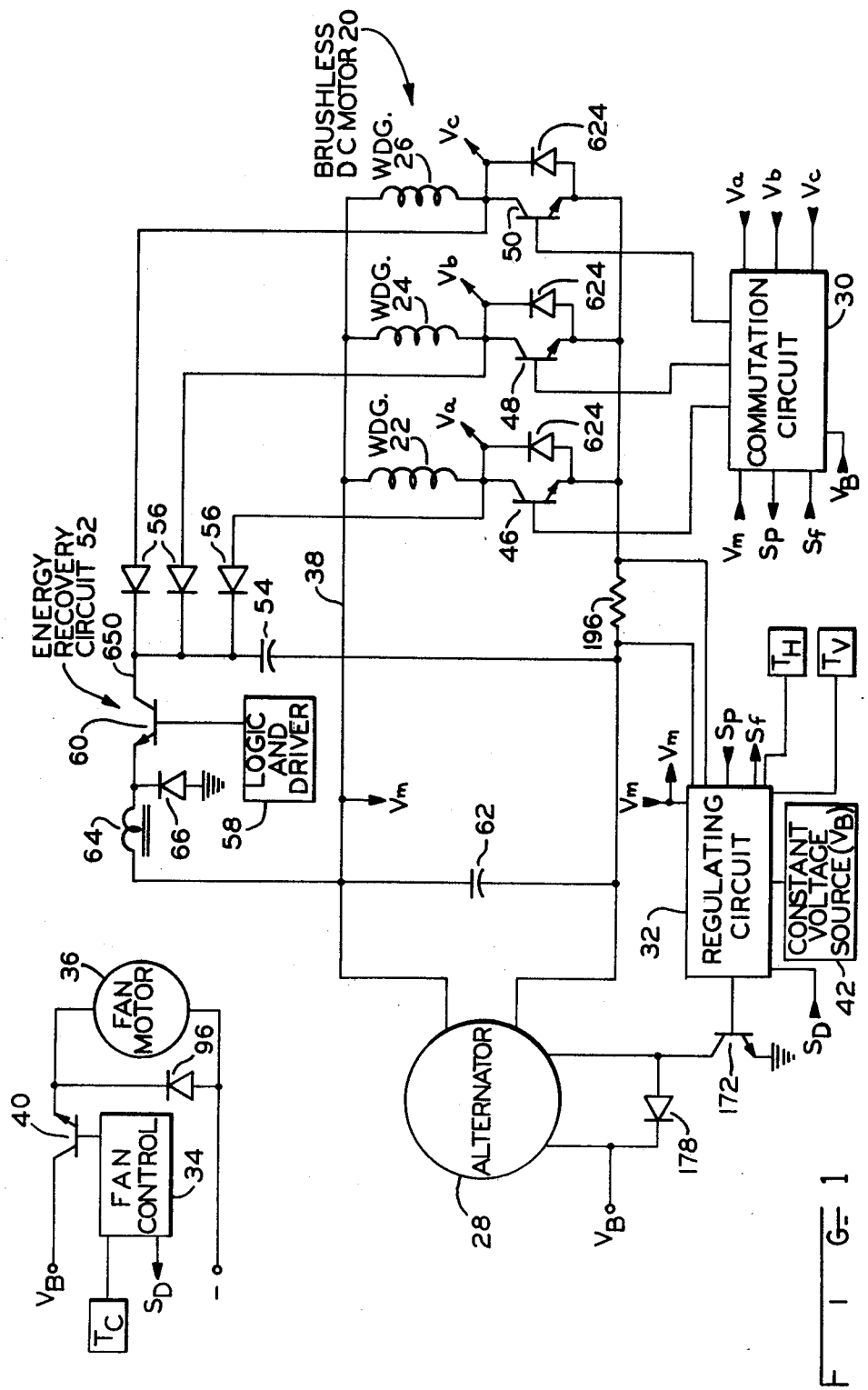
FIG. 1 is a schematic representation of a brushless DC motor and control arrangement for use with a refrigeration system in practicing the present invention in one preferred form.

FIG. 1 schematically illustrates a brushless DC motor and control arrangement particularly adapted for use with a refrigeration system such as, for example, a vehicular air conditioning system and which may be utilized in carrying out the present invention in one form. As illustrated, a three stage brushless DC motor 20 having a winding stage 22, a winding stage 24, and a winding stage 26 is provided. Each of the winding stages is connected at one end thereof to a power source, illustrated as alternator 28. An arrangement is provided for controlling operation of the brushless DC motor with such arrangement including a commutation circuit 30, a regulating circuit 32, and an evaporator fan control circuit 34.

Figure 13:
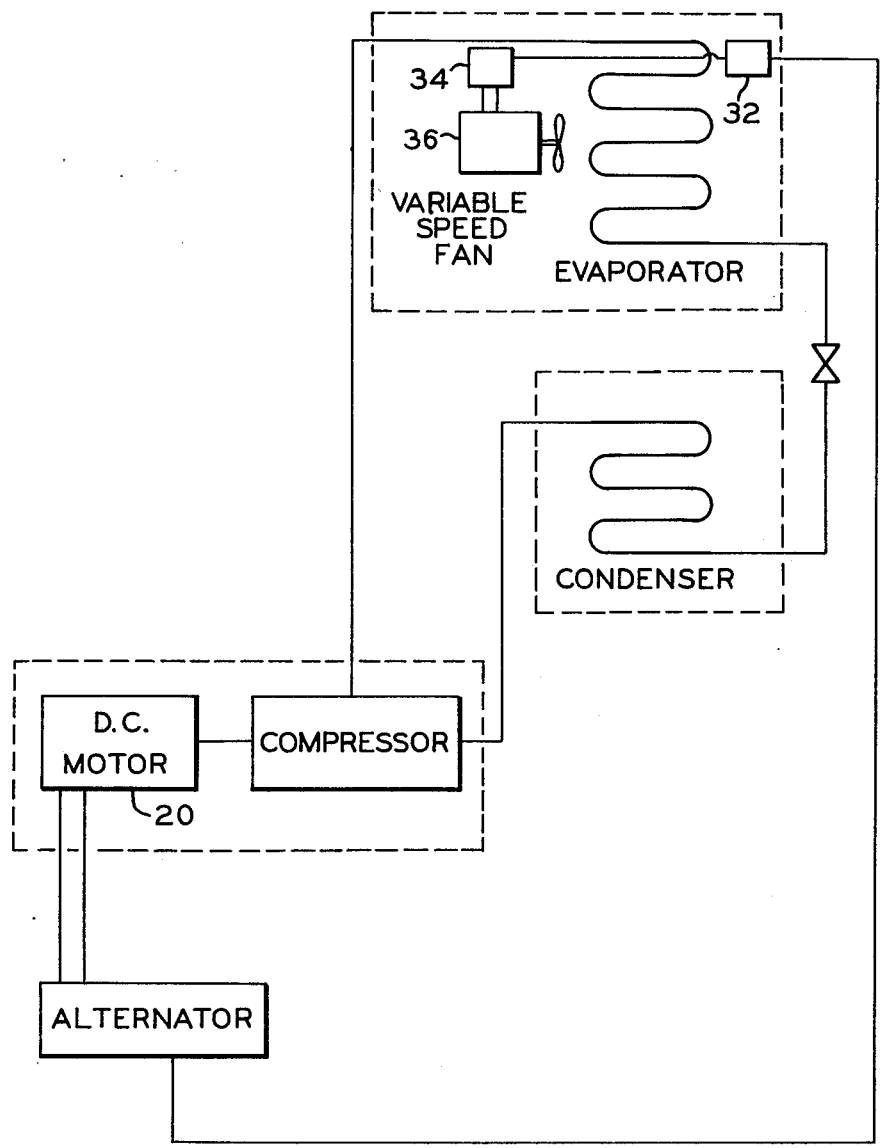
FIG. 13 is a schematic diagram more particularly showing a refrigeration system of a type with which the brushless DC motor and control arrangement of FIG. 1 is particularly adapted for use.

A typical refrigeration system, which could be controlled by the illustrated brushless DC motor and control arrangement, would be an automotive air conditioning system having a condenser, an evaporator, and a compressor. A schematic representation of such a system is shown in FIG. 13. The three stage brushless DC motor 20 includes a rotor 552 (FIG. 9) having constant magnetic polarity regions established thereon by permanent magnets. The rotor would be coupled to a compressor for moving a refrigerant in a conventional manner for cooling a passenger compartment of an automobile. As is well known, such a compressor would move a refrigerant in a liquid form through a condenser for cooling the refrigerant with a condenser fan sometimes being provided to facilitate the cooling. The liquid refrigerant would be moved from such a condenser through an expansion valve for converting the liquid refrigerant into a gaseous form at a lower pressure for subsequent feeding to an evaporator. An expansion valve, which could be utilized with a refrigeration system being controlled by the illustrated brushless DC motor and control arrangement, would be an expansion valve, of a conventional type, which would vary refrigerant flow in accordance with compressor speed and which would be operative to sense and vary refrigerant flow in accordance with evaporator temperature and refrigerant pressure. Such an evaporator would be located in the passenger compartment of a vehicle for use in controlling the temperature therein. An evaporator fan unit, which would include a motor such as fan motor 36 of FIG. 1, would be utilized to move air across an evaporator for cooling a passenger compartment of a vehicle.

One way of controlling a vehicular air conditioning system of the type discussed hereinabove will be discussed in reference to FIG. 1. As illustrated, the brushless DC motor 20 includes the winding stages 22, 24, and 26 with one end of each of the winding stages being connected to line 38 which is connected to a power source illustrated as alternator 28. The alternator has an output which is controllable over a predetermined voltage range such as, for example, from 33 volts to 82 volts to supply energization power to the winding stages. The output voltage, $V_M$, of the alternator is varied by a regulating means illustrated as the regulating circuit 32. The regulating circuit 32 controls the operating speed of the brushless DC motor by controlling the alternator output voltage so as to vary the energization level or degree of energization of the winding stages. In a refrigeration or air conditioning system, the refrigerant flow rate and thus, the effective cooling of the system is varied by varying the speed of the brushless DC motor because the motor speed determines the operating speed of a compressor connected thereto.

In the one way of controlling a vehicular air conditioning system utilizing the brushless DC motor and control arrangement of FIG. 1, the temperature, illustrated as $T_C$, of a compartment being cooled, is sensed by the evaporator fan control circuit 34. The fan control circuit compares the sensed compartment temperature with a desired compartment temperature to produce a speed control signal which is utilized to cause intermittent operation of a power switching means, illustrated as power transistor 40. Conduction of the power transistor causes a constant voltage, $V_B$, to be supplied to the fan motor from a constant voltage power source 42 which may be, for example, a twelve volt DC battery. By intermittent switching or operating the power transistor in accordance with the difference between the temperature in the compartment being cooled and the desired temperature, the average power being supplied to the fan motor 36 is varied for varying the fan motor speed. When the actual compartment temperature is higher than the desired compartment temperature, the fan control circuit causes an increase in the average power being applied to the fan motor; thus, the fan motor speed is increased for bringing the compartment temperature down to the desired temperature. Thus, the speed at which the fan motor is to be operated is also indicative of the cooling demand within a compartment being cooled. An output demand signal, $S_D$, which is indicative of the relative cooling demand, is produced by the fan control circuit by comparing the speed control signal of the circuit with a predetermined speed signal with the output demand signal, $S_D$, being produced when the predetermined speed signal is exceeded.

In controlling a refrigeration system utilizing the brushless DC motor and control arrangement illustrated in FIG. 1, an evaporator is maintained at a preselected control temperature by varying the speed of the brushless DC motor 20. As mentioned previously, the motor would be connected to a compressor; thus, by varying the motor speed, the speed of a compressor is varied to vary the flow rate of refrigerant to an evaporator. In controlling an evaporator temperature, the regulating circuit 32 senses the temperature, $T_V$, of a selected portion of an evaporator and compares this temperature with the preselected reference or control temperature. The regulating circuit controls the value of the output voltage, $V_M$, of the alternator 28 in accordance with the difference between the measured evaporator temperature, $T_V$, and the preselected reference temperature by intermittently operating a power switching means such as, for example, power transistor 172 so as to intermittently interrupt current flow to a field winding of the alternator. By controlling the output voltage signal of the alternator, the level or degree of energization of the winding stages 22, 24, and 26 is controlled so as to vary the speed of the brushless DC motor for maintaining an evaporator at the preselected reference temperature.

In order to control a refrigeration system so as to provide effective cooling under different load conditions, the preselected reference temperature of an evaporator is changed in accordance with the relative cooling demand of a compartment being cooled by the system. The regulating circuit 32 changes the preselected reference temperature in response to the output demand signal, $S_D$, of the evaporator fan control circuit 34.

For example, the regulating circuit 32 may be controlling the brushless DC motor 20 so as to maintain an evaporator at a first preselected reference temperature, for example, 45° F. (7.2° C.). If the compartment temperature, $T_C$, is at a value so as to demand that the evaporator fan control circuit control the speed of the fan motor at a relatively high speed such as, for example, ¾ of maximum fan motor speed, the fan control circuit will generate the output demand signal $S_D$, indicating a relatively high compartment cooling demand. The regulating circuit responds to the demand signal by changing its reference temperature to a second preselected reference temperature such as, for example, 30° F. (−1.1 C.). The regulating circuit will then control the evaporator temperature at the second preselected reference temperature which will lower the temperature of air being moved across an evaporator by the evaporator fan motor.

A decrease in demanded fan motor speed to a predetermined value, for example, ½ of full fan motor speed would indicate a decrease in compartment cooling demand and cause the evaporator fan control circuit to terminate the output demand signal, $S_D$. The regulating circuit would respond to the termination of the demand signal by changing the evaporator reference temperature to the first preselected reference temperature.

Figure 6:
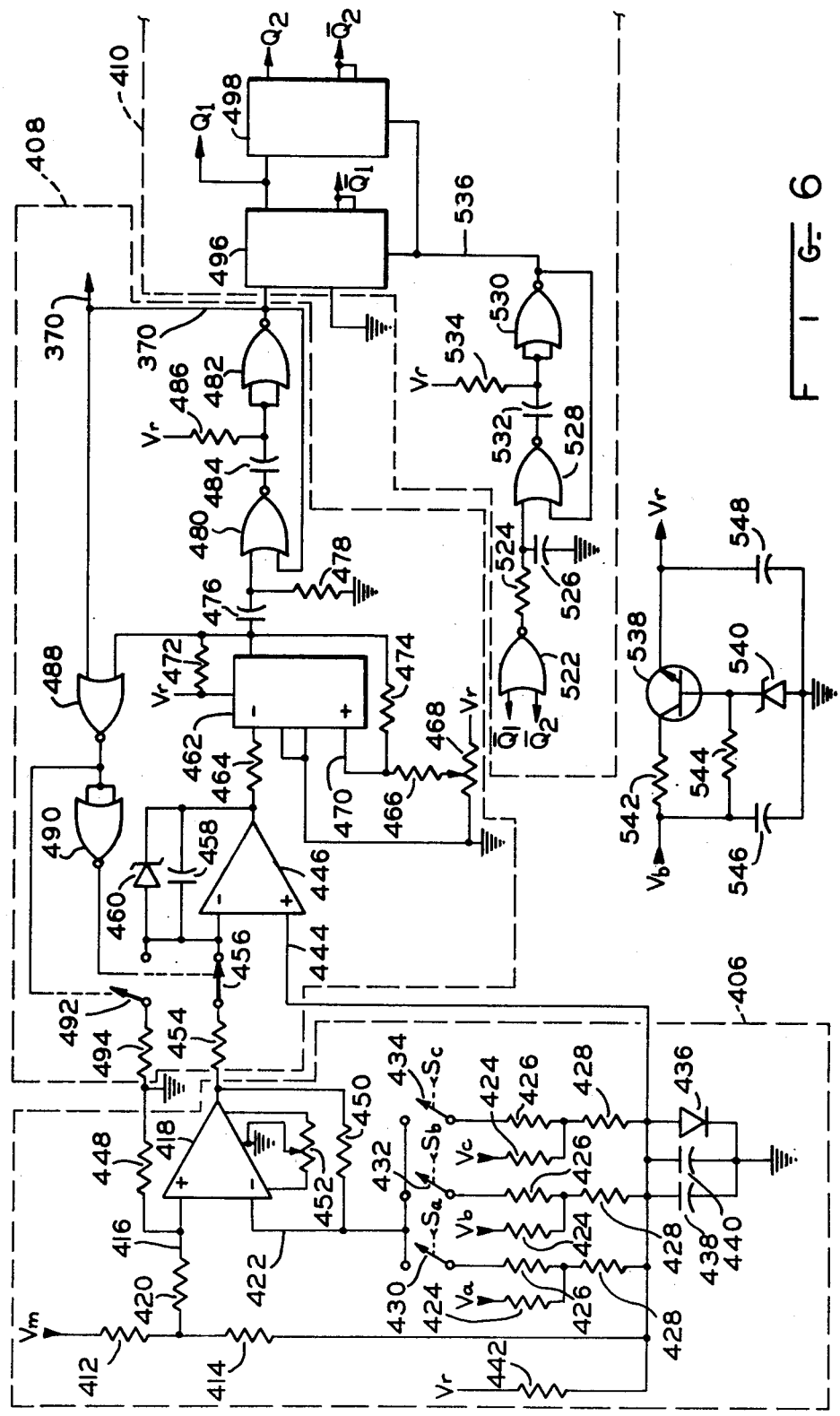
FIGS. 6 and 7 are electrical schematic diagrams showing details of a commutation circuit illustrated in FIG. 1.
Figure 7:
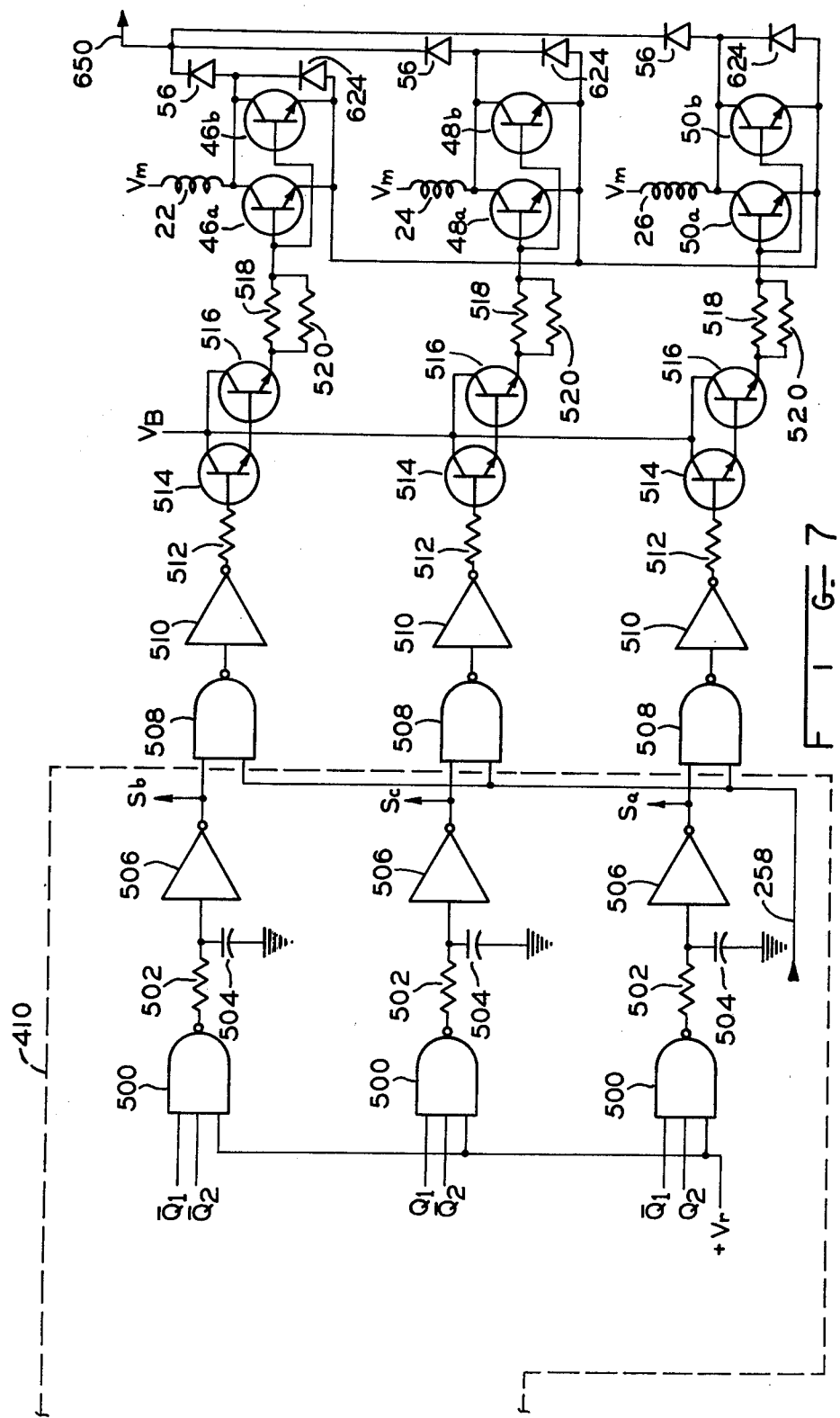

As mentioned previously, the speed of the brushless DC motor 20 is varied by varying the output voltage, $V_M$, of the alternator 28. The alternator voltage is selectively applied to the winding stages 22, 24, and 26 by selectively operating power switching means illustrated as power transistors 46, 48, and 50. The winding stages are selectively energized and deenergized with the alternator output voltage in accordance with the relative position of the rotor 552 (FIG. 9) and the winding stages of the motor. The commutation circuit 30 is responsive to the emf voltage produced in a selected unenergized winding stage for determining the relative position of the rotor and the winding stages. The commutation circuit causes selective energization of the winding stages 22, 24, and 26 by selectively operating the power transistors 46, 48, and 50. A commutation circuit such as illustrated in FIGS. 37a and 37b of my co-pending application Ser. No. 802,484, which has been previously incorporated herein by reference, may be utilized to selectively energize and deenergize the winding stages 22, 24, and 26. However, a slightly modified version of that commutation circuit is preferred in this particular application. This preferred commutation circuit is illustrated in FIGS. 6 and 7 and will be discussed more fully hereinbelow.

The preferred way of controlling a refrigeration system includes operating the brushless DC motor 20 at a predetermined minimum energization level to assure operation of a lubrication arrangement functioning to lubricate bearings of the motor. The regulating circuit 32 includes a minimum energizing means for assuring a minimum voltage output of the alternator 28. It is also preferred to limit the maximum energization level of the brushless DC motor to protect windings and power circuitry of the motor. The regulating circuit is provided with a means for limiting energization of the windings by the alternator to a maximum predetermined value. To further assure that the brushless DC motor is not operated below a predetermined low speed value, the regulating circuit is responsive to a signal Sp from the commutating circuit 30 which is representative of the speed of the brushless DC motor. The regulating circuit compares the speed of the motor with a predetermined low speed value such as, for example, 2500 rpm, and inhibits motor operation if such speed is less than the predetermined value by interrupting alternator output power and by inhibiting operation of the commutation circuit 30 by way of an output signal $S_f$. Of course, motor operation is stopped by either inhibiting the alternator output voltage or by inhibiting the commutation circuit; however, it is preferred to inhibit both the alternator and commutation circuit. The regulating circuit also includes a means to cause an automatic restart of the motor after a predetermined period of time has elapsed following a low speed shutdown. The maximum speed of the motor is further limited to a maximum predetermined speed value by the regulator circuit in that the regulator circuit compares the speed of the brushless DC motor with the maximum predetermined speed value such as, for example, 8000 rpm, and intermittently inhibits the alternator field so as to control the output voltage $V_M$ of the alternator in order to assure that the motor speed does not exceed the maximum predetermined value.

The preferred way of operating a refrigeration system also includes limiting evaporator temperature to a predetermined low temperature value. The regulating circuit 32 compares the temperature, $T_V$, of a selected portion of the evaporator with a predetermined low temperature value such as, for example, 25° F. (−3.9° C.), and inhibits operation of the alternator 28 and operation of the commutation circuit 30 if the evaporator temperature is less than the predetermined low temperature reference value which is indicative of an evaporator freeze-up condition.

It is also preferred to recover energy stored in the winding stages 22, 24, and 26 upon their deenergization. An energy recovery circuit, generally designated by reference number 52 in FIG. 1, is employed in recovering the stored energy. In operation, stored energy from the winding stages 22, 24, and 26 is fed to capacitor 54 by way of diodes 56. When the voltage across the capacitor 54 reaches a predetermined level, for example twice or slightly higher than the output voltage of the alternator 28, logic and driver circuit 58, which includes a voltage dividing circuit arrangement, operates to cause conduction of the transistor 60. Conduction of the transistor causes the stored energy to be transferred from the capacitor 54 to capacitor 62 by way of the transistor and inductor 64 for addition to the alternator output voltage, $V_M$. The inductor functions to limit and smooth the current during the energy transfer so as to protect the transistor, and diode 66 provides a path for stored current in the inductor when the transistor is not conducting.

Figure 2:
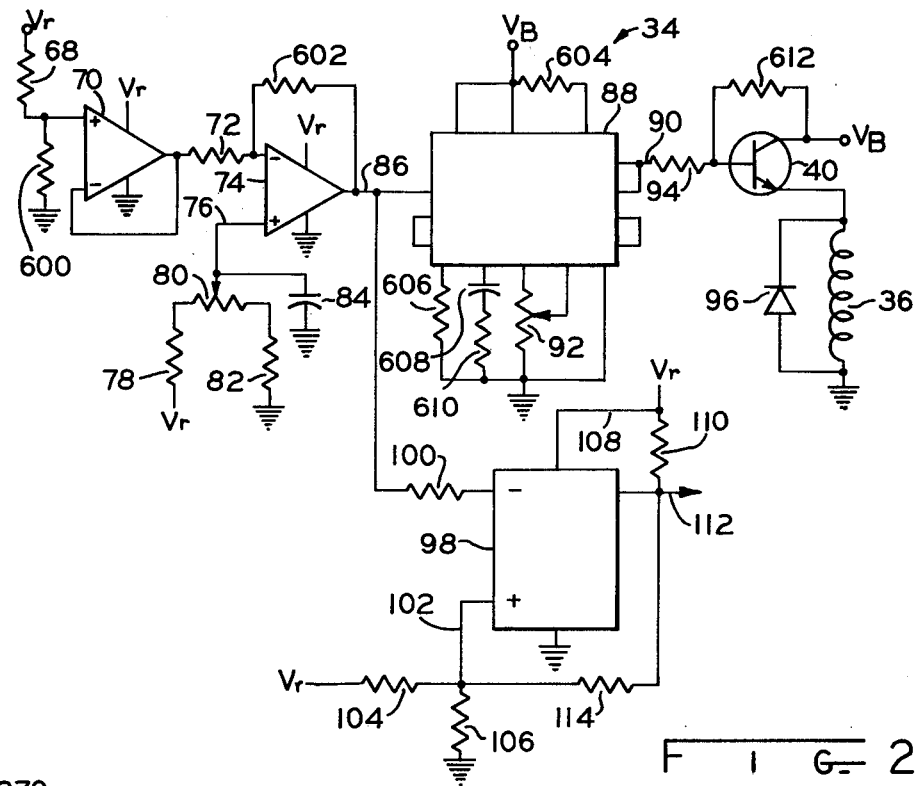
FIG. 2 is an electrical schematic diagram showing details of an evaporator fan control circuit illustrated in FIG. 1.

FIG. 2 illustrates details of the evaporator fan control circuit 34 of FIG. 1. As previously discussed, the fan control circuit 34 controls the speed of the evaporator fan motor 36 (FIG. 1) so as to vary air flow across an evaporator of a refrigeration or air conditioning system for controlling the temperature within a compartment. The temperature within a compartment being cooled is sensed by a negative temperature coefficient resistor or thermistor 68 connected to a regulated voltage source, $V_R$, for generating a signal representative of a compartment temperature. This temperature representative signal is fed through conditioning amplifier 70 and input resistor 72 to a differential amplifier 74. The amplifier 74 compares the signal representative of the temperature within a compartment with a predetermined reference voltage on line 76 which is indicative of a desired compartment temperature. The predetermined reference voltage on the line 76 is developed by a voltage dividing network comprising resistors 78, 80, and 82 with a filtering capacitor 84 also being provided. The desired reference temperature is adjusted by adjusting the variable resistor 80. When the temperature within the compartment exceeds the predetermined reference temperature as set by the resistor 80, the amplifier 74 produces an output speed control signal on line 86 which is supplied to switching regulator 88. The switching regulator, which is supplied with voltage, $V_B$, from constant voltage source 42 (FIG. 1), produces output pulse signals on line 90 which vary in duration according to the magnitude of the input speed control signal on the line 86. Adjustable resistor 92, connected to the switching regulator, provides an adjustment of the minimum switching speed for the regulator and thus, is utilized to set a minimum speed for the fan motor 36 (FIG. 1). The output pulse signals on line 90 are fed through input resistor 94 to the base of the power transistor 40. The power transistor has its collector connected to the constant voltage source 42 (FIG. 1) and its emitter connected to the fan motor 36 (depicted in FIG. 2 as a winding) having diode 96 connected thereacrosss. Conduction of the power transistor causes the constant voltage, $V_B$, to be applied to the fan motor. The intermittent switching of the power transistor in accordance with the pulse signals on line 90 causes an average power to be supplied to the fan motor. The average power and thus the speed of the motor varies as the pulse signals vary in accordance with deviation of compartment temperature from the desired compartment temperature as determined by the differential amplifier 74. The fan speed increases to move more air across an evaporator to produce greater cooling as the compartment temperature rises above the desired temperature.

The fan control circuit 34 further includes a means for determining the relative cooling demand of a compartment being cooled. In FIG. 2, the demand means is illustrated as comparator 98 which has the speed control signal of line 86 fed to one input thereof by way of resistor 100. As mentioned previously, the speed control signal determines the speed of the evaporator fan motor 36 and the speed is increased as more cooling is demanded in a compartment. Thus, the speed control signal of line 86 is indicative of fan motor speed and indicative of compartment cooling demand. The comparator 98 compares the speed control signal with a predetermined reference voltage on line 102 which is indicative of a predetermined fan speed or cooling demand. The predetermined reference voltage is developed on the line 102 by way of voltage dividing resistors 104 and 106 which are connected to the regulated voltage, $V_R$. The regulated voltage is also supplied to the comparator at line 108 and to load resistor 110 which is connected to the comparator output line 112 for setting the level of the signal thereon.

In operation, a high level logic signal is produced on the line 112 at the comparator output until the input control speed signal is greater than the predetermined reference voltage at line 102, for example, a voltage indicative of ¾ full fan speed of line 102. Whereupon, the comparator operates to reduce the logic signal ($S_D$ in FIG. 1) to a low level thereby indicating a relatively high compartment cooling demand. Feedback resistor 114 provides a deadband or hysteresis resetting effect for the compartor, i.e., the speed control signal must decrease to a lower predetermined voltage, for example, a voltage indicative of ½ full fan speed before the comparator will reset.

Figure 5:
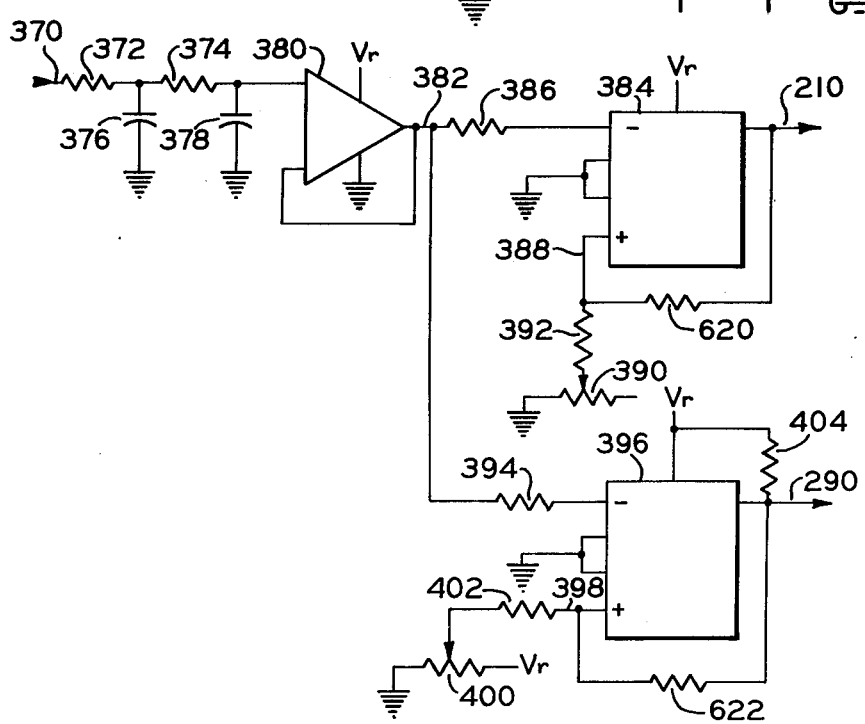
FIGS. 3, 4, and 5 are electrical schematic diagrams showing details of a regulating circuit illustrated in FIG. 1.
Figure 3:
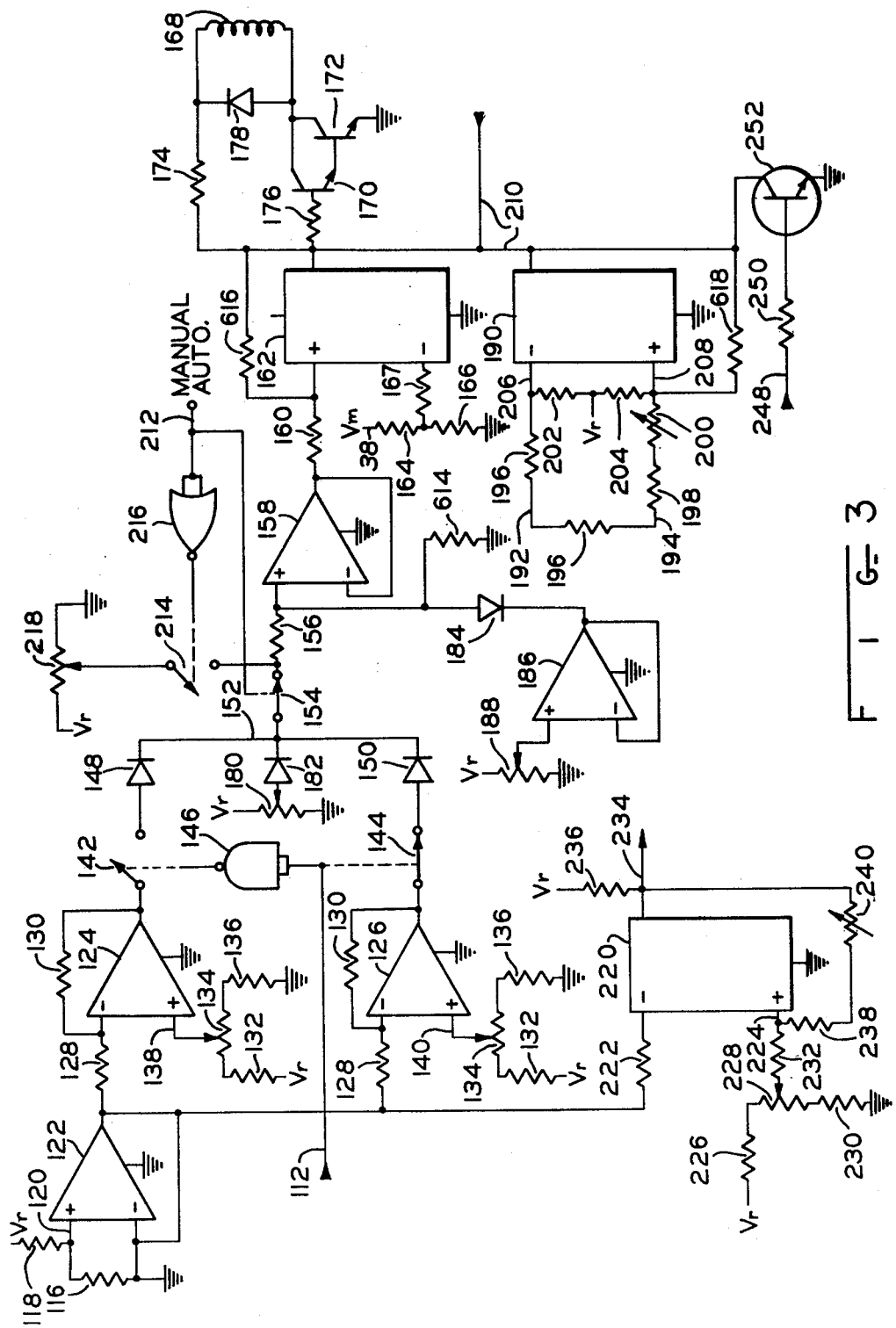
Figure 4:
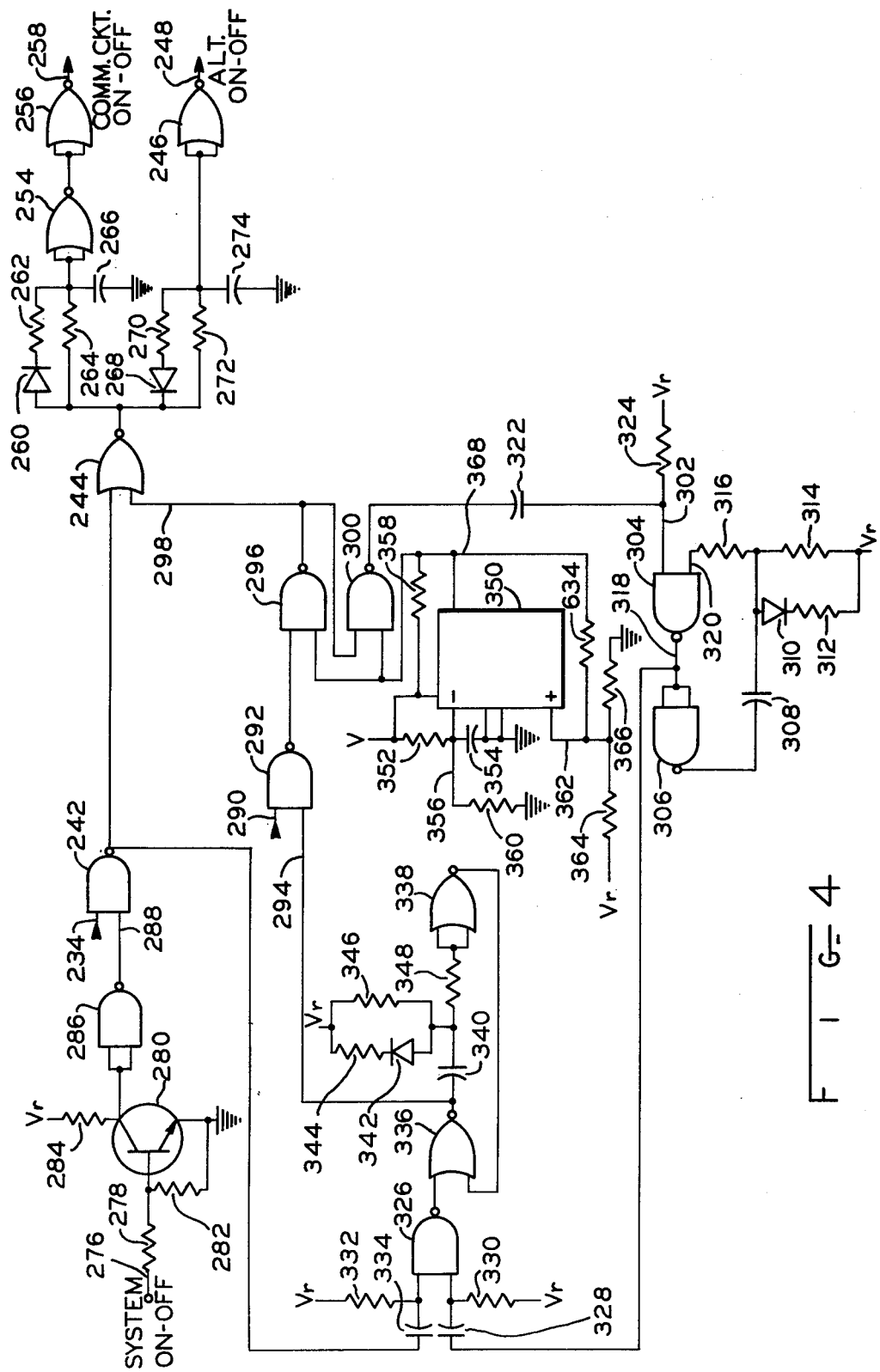

FIGS. 3-5 illustrate details of the regulating circuit 32 of FIG. 1. Referring to FIG. 3, a negative temperature coefficient resistor or thermistor 116 is connected to regulated voltage supply $V_R$ by way of resistor 118 to produce a signal on line 120, which is representative of the temperature of a selected portion of an evaporator. This representative signal is supplied through an amplifier 122 to either of two differential amplifiers, 124 or 126 having identical input and gain resistors, 128 and 130, respectively. Each of the amplifiers 124 and 126 have an identical voltage dividing network connected thereto comprising resistors 132, 134, and 136 with resistors 132 being connected to regulated voltage, $V_R$. However, the resistors 134 are adjusted to different resistance values so as to provide different predetermined voltages on lines 138 and 140 at the input of the amplifiers 124 and 126, respectively. The predetermined voltage on line 138 is indicative of a first preselected reference temperature such as, for example, 30° F. (−1.1° C.), and the predetermined voltage on line 140 is indicative of another preselected reference temperature such as, for example, 45° F. (7.2° C.). The position of switch contacts 142 and 144, which are connected in series with the outputs of the amplifiers 124 and 126, respectively, and which have diodes 148 and 150, respectively, connected thereto, determine which amplifier is operative, and thus, determine the reference temperature at which an evaporator is to be controlled. The switches are operated in response to the logic signal on line 112 from the fan control circuit with the logic signal being fed through NAND gate 146, connected as an inverter, for operating contact 142.

A signal is prduced on line 152 by either amplifier 124 or 126 which is representative of the deviation of the evaporator temperature from a predetermied selected reference temperature, This representative signal is fed through manual-automatic switch contact 154, resistor 156, amplifier 158 and resistor 160 to one input of comparator 162. The other input to the comparator 162 is connected to line 38 at the output of the alternator 28 (FIG. 1) by way of voltage dividing resistors 164, 166, and 167 so as to produce an input signal representative of the output voltage, $V_M$, of the alternator.

In operation, the comparator 162 compares the signal at its one input, which is representative of evaporator temperature deviation from a preselected reference temperature, with the signal representative of the alternator output voltage, and interrupts current flow through a field coil 168 of the alternator when the temperature representative signal is less than signal representative of the alternator voltage. Current flow throught the alternator field coil 168 is provided when transistors 170 and 172 are made conductive by feeding a signal to the base of the transistor 170 by way of resistors 174 and 176; however, operation of the comparator 162 interrupts current flow through the field coil by establishing an alternate signal path from the resistor 174 to ground therby making the transistors 170 and 172 non-conductive. Diode 178 connected across the field coil provides an alternate path for current in the coil when the transistors are non-conductive. By interrupting the field coil current in accordance with evaporator temperature deviation from a predetermined reference temperature, the alternator output voltage, $V_M$, and thus the speed of the brushless DC motor 20 (FIG. 1) is controlled to maintain an evaporator temperature at the predetermined reference temperature.

The regulator circuit is also provided with a means of assuring a minimum alternator output voltage which in turn assures that the winding stages 22, 24, and 26 (FIG. 1) of the brushless DC motor will be energized at a predetermined minimum voltage level. As illustrated in FIG. 3, this predetermined minimum energization level is provided by supplying a predetermined voltage level to line 152 by way of resistor 180 and diode 182 with the resistor being connected to regulated voltage, $V_R$. This predetermined voltage level, on line 152, may be varied by adjusting the resistor 180 which in turn adjusts the minimum energization level and speed of the motor.

The regulating circuit is also provided with a means to limit the maximum energization level of the winding stages 22, 24, and 26 of the brushless DC motor. As illustrated in FIG. 3, this limiting means comprises a clamping circuit including diode 184 and amplifier 186 having an adjustable input voltage provided by resistor 188 connected to the regulated voltage supply, $V_R$. The clamping voltage, and thus, the maximum energization level for the winding stages, may be varied by adjusting the variable resistor 188.

The regulating circuit is also provided with a means to limit current in the brushless DC motor. As shown in FIG. 3, a comparator 190 is provided to limit the motor current by interrrupting current to the alternator field coil 168. By interrupting the field coil current, the comparator controls the alternator output voltage so as to limit motor current to a maximum predetermined value such as, for example, 60 amperes peak current. The current in the winding stages is sensed by the comparator 190 by connecting wire leads 192 and 194 across a shunt resistor 196 (FIG. 1). The shunt resistor has a low resistance value such as, for example, 0.003 of an ohm and is connected in series with the winding stages 22, 24, and 26 as illustrated in FIG. 1. A voltage dividing arrangement comprising resistors 196, 198, 200, 202, and 204 is provided at the inputs of the comparator with resistors 202 and 204 being connected to a regulated volage, $V_R$. When the motor current exceeds a predetermined maximum value, as set by the adjustable resistor 200, the input voltage to the comparator at line 206 will exceed the input voltage at line 208, and cause operation of the comparator. Operation of the comparator causes an interruption in current flow to the alternator field coil in that a current path from line 210 to ground is established through the comparator, thereby causing non-conductive of the transistors 170 and 172.

The regulating circuit is also provided with a means for allowing either manual or automatic operation of the ciruit. For automatic operation, a signal is supplied on line 212 for causing closure of the switch 154 which is connected in series with resistor 156. When the switch 154 is closed, the evaporator temperature, as sensed by the thermistor 116, will be automatically controlled at a predetermined reference temperature as set by either amplifier 124 or amplifier 126. In manual operation, the contact 154 is opened and contact 214 is closed by a signal from NOR gate 216. With the contact 214 closed, the temperature of an evaporator can be manually controlled by way of adjustable resistor 218 which is connected to the regulated voltage, $V_R$.

The regulating circuit is also provided with a means to inhibit operation of the brushless DC motor when the evaporator temperature, as sensed by the thermistor 116, is less than a predetermined low temperature value. As discussed previously, the voltage at the output of the amplifier 122 is representative of the temperature at a selected portion of an evaporator. This representative signal is supplied to a comparator 220 by way of resistor 222 where it is compared with a predetermined reference voltage on line 124, which is representative of a predetermined low temperature value such as, for example, 25° F. (−3.9° C.). The predetermined reference voltage is provided by a voltage divider circuit comprising resistor 226, which is connected to the regulated voltage, $V_R$, and resistors 228, 230, and 232. The predetermined voltage may be adjusted by adjusting the variable resistor 228. In operation, a high level logic signal is normally produced on line 234 at the comparator output by the regulated voltage $V_R$ and load resistor 236; however, when the evaporator temperature drops to the predetermined low temperature value, the comparator 220 operates to cause the logic signal on line 234 to go to a low level. Feedback resistors 238 and 240 provide a resetting of the comparator at a voltage different than the predetermined reference voltage such as, for example, a voltage indicative of 35° F. (1.7° C.), thus, the feedback resistors provide an operating deadband for the comparator which can be varied by adjusting the resistor 240.

Referring to FIG. 4, a low level logic signal on line 234 caused by operation of the comparator 220 (FIG. 3) when the evaporator temperature is below a predetermined low value, will cause operation of NAND gate element 242, NOR gate element 244 and inverting NOR gate element 246. The operation of these logic elements causes a high level logic signal to be produced at line 248 for inhibiting operation of the alternator 28 (FIG. 1). Referring to FIG. 3, the alternator is inhibited by interrupting current flow to the alternator field coil 168. This current interruption is accomplished by feeding the high level logic signal of line 248 through resistor 250 to the base of transistor 252 for causing conduction thereof. Conduction of the transistor 252 establishes a current path to ground thereby making transistors 170 and 172 non-conductive, and thus, interrupting current flow in the alternator field coil 168.

Referring again to FIG. 4, it can be seen that the operation of the NAND gate element 242 and the NOR gate element 244, during a low evaporator temperature condition, will also cause operation of two inverting NOR gate elements 254 and 256 to produce a low level logic signal on line 258. This signal is fed to the motor commutation circuit (FIG. 7) for inhibiting further commutation of the brushless DC motor during the low evaporator temperature condition.

As shown in FIG. 4, two time delay circuits are provided for delaying turn-on and shut-off signals produced on lines 258 and 248. A first delay circuit, comprising diode 260, resistors 262 and 264 and capacitor 266, is connected between the NOR elements 244 and 254. A second time delay circuit, comprising diode 268, resistors 270 and 272 and capacitor 274, is connected between the NOR elements 244 and 246. The two time delay circuits have identical resistance and capacitance values with the resistors 262 and 270 having relatively low resistance values, for example, 10 k ohms, and with resistors 264 and 272 having relatively high resistance values, for example 1 megohm. However, different time delays are produced by connecting the diodes 260 and 268 in an opposite manner to resistors 262 and 270, respectively. With these time delay arrangements, a high level logic signal at the output of the NOR element 244, i.e., a turn-on condition, will cause a signal to be produced on the line 258 for enabling operation of the commutation circuit prior to production of an alternator enabling signal on the line 248. However, during an inhibit condition, i.e., a low level logic signal at the output of the NOR element 244, an alternator inhibit signal is produced on the line 248 prior to production of a commutation inhibit signal on the line 258.

FIG. 4 also illustrates a logic arrangement for manually disabling or inhibiting further operation of the alternator and the commutation circuit. When the system is in the "on" condition, a high level logic signal is applied on line 276. This high level logic signal is fed through resistor 278 to the base of NPN transistor 280 having resistor 282 connected between the base and emitter thereof, and having load resistor 284 connected to the collector. The high level logic signal causes conduction of the transistor to produce a low level signal at the collector. This low level signal is inverted by NAND element 286 to produce a high level signal on line 288 at the input of the NAND element 242. On the other hand, when the system is placed in the "off" condition, the high level signal, at the line 276, is removed which causes a low level signal to be produced at the line 288 of the NAND element 242. A low level signal at the input to the NAND element 242 causes an inhibiting low level signal to be produced on the line 258 and also causes an inhibiting high level signal on the line 248 in the same manner as the previously discussed low temperature signal of the line 234.

FIG. 4 also illustrates logic circuit arrangements for inhibiting operation of the alternator and the commutation circuit during a low motor speed condition or during a high temperature condition. When the brushless DC motor is operating above predetermined low speed limit, a low logic signal is present at input line 290 of NAND element 292. Derivation of the signal on line 290 will be discussed later in this application in describing FIG. 5. However, when the speed of the brushless DC motor falls below a predetermined low speed limit, for example, 2500 revolutions per minute (rpm), a high level logic signal is produced on line 290. The signal level at the other output, i.e., line 294 of the NAND element 292 is normally high; thus, a low speed signal on line 290 will cause operation of the NAND element to produce a low level logic signal at NAND element 296. The low level signal causes operation of the NAND element 296 thereby producing a high level logic signal on line 298 at the input of the NOR element 244 which causes operation of the NOR element. As discussed previously, operation of the NOR element 244, i.e., causing its output to go to a low level, produces alternator and commutation circuit inhibit signals on lines 248 and 258, respectively.

A circuit arrangement is provided, as illustrated in FIG. 4, for automatically restarting the brushless DC motor after a predetermined time has elasped following operation of the low speed inhibiting circuitry described hereinabove. As mentioned previously, a high level logic signal is produced on the line 298 when the motor speed is below a predetermined low speed value. For automatically restarting the motor, the high level signal on the line 298 is fed to the input of NAND element 300. The other input to the NAND element 300 is also at a high signal level provided no high temperature limit has been exceeded as will be later discussed. Thus, a low level signal is produced at the output of the NAND element 300 causing a low signal level at line 302 of a one-shot timer arrangement comprising NAND elements 304 and 306, capacitor 308, diode 310 and resistors 312, 314, and 316. A low level signal on line 302 causes the NAND element 304 to produce a high level output to line 318 which in turn causes the NAND element 306 to produce a low level output signal thereby dropping the charge or voltage across the capacitor 308. When the capacitor voltage is lowered, a low signal level results at line 320 or the other input of the NAND element 304. The signal at the line 302 goes back to a high level as capacitor 322 is recharged by the regulated voltage, $V_R$, by way of resistor 324. A longer time delay, for example, two minutes, is provided for recharging the capacitor 308 by way of the resistor 314. After a predetermined period of time has elasped, the capacitor 308 is recharged to produce a high level logic signal on the line 320. This high level signal on line 320 causes operation of the NAND element 304 which in turn causes a low level signal to be produced on line 318. A drop in signal level on line 318 causes operation of NAND element 326 which is connected to line 318 by way of capacitor 328. The capacitor 328 is recharged by the regulated voltage, $V_R$, which is connected to the capacitor by way of resistor 330. An identical arrangement is provided at the other input of the NAND element 326 by resistor 332 and capacitor 334. When the NAND element 326 is operated, by the low level signal on the line 318, a high level signal is produced at its output for triggering another one-shot timer arrangement comprising NOR elements 336 and 338, capacitor 340, diode 342, and resistors 344, 346, and 348. Operation of the one shot timer causes the signal level on line 294 to drop, thereby operating the NAND element 292 to produce a high level signal at the output thereof for overriding the low speed signal on the line 290. Thus, a low level signal is produced at the input of the NOR element 244, i.e., at line 298, thereby enabling restart of the brushless DC motor.

A low speed inhibit signal on the line 290 is overridden by operation of the previously described one-shot NOR timer arrangement for originally starting the system as well as following a time delayed restart. However, the speed of the brushless DC motor must reach a predetermined low speed value within a predetermined period of time such as, for example, six seconds, or else a high level signal will once again be produced on the line 294 to cause operation of the commutation circuit and alternator to be inhibited. The predetermined time delay is provided by the resistor 346 and the capacitor 340 in the illustrated circuit.

The regulating circuit is also provided with a means for inhibiting operation of the alternator and the commutation circuit when a temperature, at a preselected sensing location in the system, exceeds a predetermined high temperature limit. For example, in the illustrated arrangement, the temperature is sensed at a heat sink provided for the motor power transistors; however, the temperature at other locations such as, for example, a compressor case could be monitored for high limit. Referring again to FIG. 4, a high temperature limit is provided by comparator 350 having a resistor 352 and filtering capacitor 354 connected to its input line 356. The comparator is also provided with an output load resistor 358 for setting the level of its output logic signal. A positive temperature coefficient resistor 358 is also connected to the input line 356 for sensing the temperature of the power transistor heat sink. The comparator compares the input signal at the line 358, which is representative of heat sink temperature, with a predetermined reference voltage which is indicative of a predetermined high temperature value. This predetermined reference voltage is establisehd on line 362 at the other input of the comparator by the regulated voltage, $V_R$, and voltage dividing resistors 364 and 366.

When the positive temperature coefficient resistor (PTCR) 360 senses a high temperature such as, for example, 85° C., the predetermined reference voltage at the line 362 is exceeded causing operation of the comparator. Operation of the comparator causes a logic signal, at output line 368 thereof, to drop to a low level. This low level signal is transmitted to an input of the NAND element 296 for causing operation of the NAND element. Operation of the NAND element 296 causes operation of the NOR element 244 to produce commutation circuit and alternator inhibit signals as previously discussed. The low level signal of the line 368 is also fed to an input of the NAND element 300 to prevent automatic time delayed restart of the alternator and commutation circuit until the high temperature condition has ceased.

The regulating circuit is further provided with a means for detecting that the brushless DC motor has reached a high speed limit value and for controlling the motor once the high speed value limit has been reached so as to prevent damage to the motor at its power circuitry. An excessive high speed may be demanded when, for example, a refrigeration system has lost its charge and/or a temperature sensor has failed. Referring to FIG. 5, a pulse signal is transmitted on line 370 from the commutating circuit (see FIG. 6) each time a winding stage of the brushless DC motor is energized; thus, this signal is indicative of the relative speed of the motor. The pulse signals are fed through a low pass filter, comprising resistors 372 and 374 and capacitors 376 and 378, to amplifier 380 for producing a signal at line 382 which is representative of an average motor speed. This average speed signal on line 382 is fed to comparator 384 by way of resistor 386. The comparator 384 compares this average speed input signal with a predetermined reference voltage on line 388 which is produced by way of the regulated voltage, $V_R$, and voltage dividing resistors 390 and 392. This predetermined reference voltage may be varied by adjustment of the adjustable resistor 390. When the average speed signal exceeds the predetermined reference voltage which is indicative of a predetermined maximum speed such as, for example, 8,000 revolutions per minute (rpm), the comparator operates to ground its output line 210. As illustrated in FIG. 3, this output line 210 is connected to the switching transistors 170 and 172 which allow current flow through the alternator field coil 168 when in their conductive state. However, grounding of the line 210 switches the transistors to a non-conductive state thereby interrupting current flow through the field coil of the alternator. Thus, operation of the comparator 384 controls the output voltage of the alternator so as to prevent the exceeding of the maximum predetermined motor speed.

The averge speed signal, produced at the line 382 of FIG. 5 is also fed, by way of resistor 394, to a comparator 396. This average speed signal is compared by the comparator with a predetermined reference voltage on line 398 which is indicative of a predetermined low motor speed value, such as, for example, 2500 rpm. The predetermined reference voltage is produced at the line 398 by way of regulated voltage, $V_R$, adjustable resistor 400 and resistor 402. When the averge speed indicative signal, at the input to the comparator, falls below or is less than the predetermined reference voltage on the line 398, a high level logic signal is produced at the output line 290 of the comparator with the level thereof being set by load resistor 404. This high level signal is fed to the NAND element 292 for causing an inhibiting of operation of the commutation circuit and the alternator as previously discussed in the description of FIG. 4.

FIGS. 6 and 7 illustrate details of the commutating circuit 30 of FIG. 1. As previously mentioned, this commutating circuit is substantially similar to the commutating circuit illustrated in FIGS. 37A and 37B of my co-pending application Ser. No. 802,484, the disclosure of which has been previously incorporated herein by reference. The arrangement disclosed herein applies a higher voltage to motor winding stages than the previously disclosed arrangements; thus, some modifications were made from the previously disclosed arrangement in order to accommodate for differences in cost and availability of circuit components.

As mentioned previously, the commutating circuit 30, as shown in FIG. 1 and FIGS. 6 and 7, detects the emf voltage generated in a selected unenergized winding stage, processes the detected emf signal so as to determine the relative position of the rotor and winding stages, and produces a simulated relative position output signal for selectively energizing and deenergizing the winding stages 22, 24, and 26 in accordance with the relative position of the rotor and windings.

Referring to FIGS. 6 and 7, a detector circuit 406, shown within dotted lines in FIG. 6, is connected to each of the winding stages to selectively sense the emf voltage of a particular winding stage such as, for example, the next winding stage to be energized. The emf voltage of the particular winding stage being sensed is determined by subtracting the alternator output voltage, $V_M$, and the voltage at the opposite end of the particular winding stage, for example, $V_A$, $V_B$, $V_C$. The emf voltage is then fed to a position determining circuit 408 wherein the emf voltage is conditioned and processed to produce a simulated relative position output signal which is indicative of the relative position of the rotor and windings of the motor. In the illustrated circuit arrangement, such simulated relative output signal is in the form of a logic signal at the output of the position determining circuit.

In order to select the next winding stage to be energized, a circuit means 410 processes the incoming simulated position signal through an indexing or sequence arrangement to produce an output signal for triggering energization of a particular winding stage. The circuit means also causes deenergization of the previously energized winding stage and selection of another deenergized winding stage to be sensed by the detector circuit. This operational procedure occurs continuously during motor operation with the emf voltage of each winding stage being selectively detected and processed to selectively energize and deenergize each of the winding stages.

In more detail, the detector circuit 406 of FIG. 6 senses the output voltage, $V_M$, of the alternator 28 (FIG. 1). This voltage signal is reduced by a voltage divider including resistors 412 and 414, and fed to input line 416 of differential amplifier 418 by way of resistor 420. The voltage signals at the opposite ends of each of the winding stages, that is $V_A$, $V_B$, and $V_C$, are selectively fed to line 422 at the other input of the differential amplifier through respective resistors 424, respective voltage dividers including resistors 426 and 428, and switching contacts 430, 432, and 434, respectively. Only the switching contact for the particular unenergized winding stage in which emf voltage is being detected will be closed. A predetermined minimum voltage such as, for example, 0.7 volts is provided by a power supply comprising diode 336 and capacitors 338 and 340 with power being supplied to the capacitors by the regulated voltage, $V_R$, by way of resistor 342. Thus, a predetermined minimum voltage level is assured at the input line 422 of the differential amplifier and at input line 444 of amplifier 446 in the position determining circuit. The differential amplifier 418 also has resistor 448, feedback resistor 450 and adjustable resistor 452 connected thereto with the adjustable resistor 452 providing an amplifier bias.

The emf voltage output signal of the differential amplifier 418 is supplied to the operational amplifier 446 by way of resistor 454 and switch contact 456. The operational amplifier, with capacitor 458 and zener diode 460 connected thereacross, operates to integrate positive emf voltage from the zero crossing point of the emf voltage signal. The zener diode functions to prevent integration of negative emf voltage so that integration starts at the zero crossing of the emf voltage, and the diode also determines the reset reference voltage of the capacitor 458 prior to beginning each integration. When the integrated voltage equals a predetermined reference level or a predetermined number of volt-seconds has been reached, comparator 462, which is connected to the operational amplifier output by way of resistor 464, is operated to produce high level logic signal at the output of the comparator. The predetermined reference level at which the comparator is operated is determined by a voltage divider comprising resistor 466 and adjustable resistor 468. The adjustable resistor is connected to the regulated voltage, $V_R$, for producing a predetermined reference voltage at input line 470 of the comparator. The comparator, having load resistor 472 and feedback resistor 474 connected thereto, provides a Schmitt trigger function so as to produce an output pulse when the integrated voltage level falls below the predetermined reference voltage.

Figure 10:
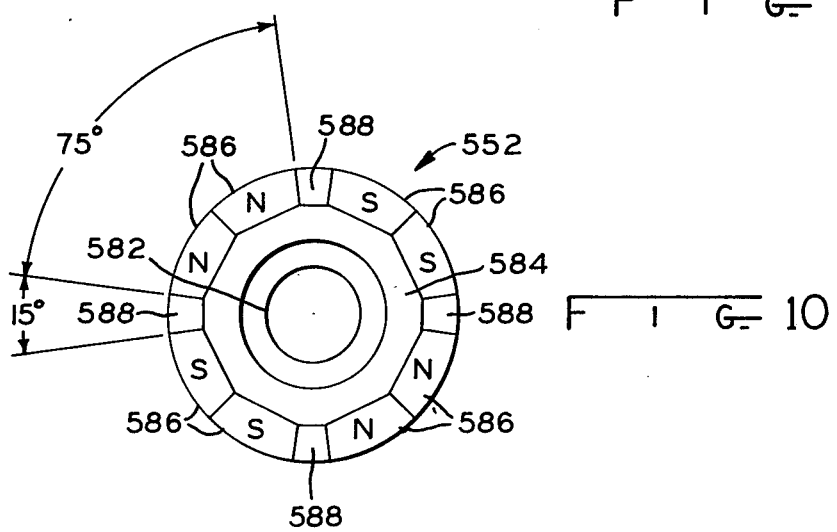
FIG. 10 is a front elevational view of a permanent magnet rotor for the brushless DC motor of FIG. 1.

As will be discussed in more detail later in this application, the rotor 552, illustrated in FIG. 10, is provided with arcuate permanent magnet segments 586 disposed on a low reluctance core 584 so as to establish constant magnetic polar regions with North-South polarizations.

The integrated emf voltage level, at which the comparator 462 of FIG. 6 operates, is indicative of a predetermined relative position of the rotor and windings of the brushless DC motor. The comparator output signal indicates that this predetermined position has been reached, and thus, the signal is utilized to commutate the winding stages of the motor, as will be discussed more fully hereinbelow. However, this predetermined number of volt-seconds or commutation level is selected to provide an advance timing angle or a predetermined amount of advancement. A zero advance would exist if a winding stage was turned on when the magnetic center of a rotor established polar region was moving theretoward and at the instant that the magnetic center of the region was 135 electrical degrees from alignment with an axis of a magnetic pole established by energizing the winding stage. A zero advancement of commutation is a theoretical optimum; however, switching the winding stage before this theoretical optimum, i.e., providing advancement of commutation, is preferred in order to allow for current build-up in the winding stage to achieve the maximum possible torque throughout the "on" time of the winding stage. The preferred amount of advancement is associated with the L/R time constant of a winding stage; however, typically the prefered advancement of commutation is from about five electrical degrees to about 30 electrical degrees. For a more complete discussion of advancement of commutation, reference may be made to FIG. 3 and attendant description in my co-pending application Ser. No. 802,484. In the circuit arrangement disclosed herein, the advancement of commutation angle may be adjusted by adjusting the variable resistor 468 and thereby changing the operating voltage of the comparator 462.

The high logic level output signal of the comparator 462, which indicates that a predetermined relative position has been reached, is fed through an RC filter, comprising capacitor 476 and resistor 478, to a one-shot multivibrator comprising NOR elements 480 and 482, capacitor 484 and resistor 486. This input signal causes the multivibrator to produce a high logic level output signal at the line 370 which is utilized by the circuit means 410 to cause winding stage commutation. The multivibrator output signal is also fed to the previously discussed high speed and low speed circuitry (FIG. 5) of the regulating circuit. Still further, the multivibrator output signal on the line 370 and the output signal of the comparator 462 are fed to a logic arrangement comprising NOR elements 488 and 490 for closing reset switch 492, having resistor 494 connected thereto, and for opening the contact 456. Operation of the NOR elements and switches resets the integrator by recharging the capacitor 458 back to a predetermined reference level.

The circuit means 410 receives the high logic level output signal of the multivibrator on the line 370, which is indicative of a predetermined relative position, and utilizes this signal to: select the next winding stage to be energized; cause deenergization of the presently energized winding stage; and to select another unenergized winding stage for detection of emf voltage therein by the detector circuit 406. In order to accomplish these selections, the multivibrator output signal is supplied to a flip-flop arrangement comprising flip-flops 496 and 498 to provide signals Q1 and Q2 along with their complements ($\overline{Q1}$, $\overline{Q2}$) to be logically combined by a decoder comprising three NAND elements 500. The decoding of the Q1 and Q2 signals and their complements causes a low level logic signal to be produced at the output of one of the NAND elements 500 and high logic level signals at the outputs of the remaining two NAND elements 500.

As illustrated in FIG. 7, three identical circuits are provided at the outputs of the three NAND elements 500 for switching the three winding stages 22, 24, and 26. Each of these circuits comprise an RC filter comprising resistor 502 and capacitor 504, an invertor 506, a NAND element 508, an invertor 510, a resistor 512, switching transistors 514 and 516, and current limiting resistors 518 and 520. The circuit functions to cause selective energization and de-energization of the winding stages 22, 24, and 26 by switching parallel connected power transistors 46a and 46b, 48a and 48b, and 50a and 50b, respectively, which are provided for switching the alternator output voltage, $V_M$.

When a low level logic signal is produced at the output of one of the NAND elements 500, the signal is inverted by an invertor 506. This inverted signal (Sa, Sb, or Sc) causes a closure of one of the switch contacts (430, 432, or 434) for selecting another unenergized winding stage for emf voltage sensing by the detecting circuit 406 of FIG. 6. This inverted signal also causes operation of a respective NAND element 508, invertor 510 and switching transistors 514 and 516 to cause a switching of the appropriate power transistors for energization of another winding stage. The NAND elements 508 have another input signal supplied thereto by way of line 258 to inhibit energization of any of the winding stages when so directed by the regulating circuit as previously discussed in reference to FIG. 4.

The circuit means 410 continuously indexes with each signal from the position determining 408 to cause energization of another winding stage, de-energization of the previously energized winding stage and selection of another unenergized winding stage for emf sensing by the detecting circuit 406. Resetting of the flip-flops 496 and 498 for providing this continuous indexing or sequencing is provided by NOR element 522 whose output signal is filtered by way of resistor 524 and capacitor 526. This multivibrator output signal causes operation of another one-shot multivibrator comprising NOR elements 528 and 530, capacitor 532, and resistor 534. Operation of this multivibrator produces a reset signal on line 436 which is fed to each of the flip-flops 496 and 498.

At the starting of the brushless DC motor, the back emf voltages sensed by the detetor circuit may be zero and thus, voltage-time integration in the operational amplifier 446 might not take place except for the presence of a means for adding starting which causes a characteristic signal, which is indicative of low motor speed emf voltage, to be produced. In the illustrated arrangement, this characteristic signal is produced by adjusting the bias resistor 352 so as to cause a low speed characteristic signal to be produced at the output of the differential amplifier 418; thus, continuous cycling of the integrating amplifier 446 and previously described reset circuitry is provided to assure starting of the brushless DC motor.

FIG. 6 also illustrates a regulated voltage source for producing the regulated voltage, $V_R$, for use as a voltage source to the logic packages, operational amplifiers and circuitry illustrated herein. As shown, the direct current source voltage, $V_B$, is fed through a regulating arrangement comprising emitter follower transistor 538, zener diode 540, resistors 542 and 544, and noise filtering capacitors 546 and 548 to produce the regulated voltage, $V_R$, which may be, for example, 7.6 volts.

As mentioned previously in the discussion of FIG. 1, a recovery circuit 52 is provided for recovering energy stored in the winding stages upon their de-energization. This stored energy is fed from the winding stages through the diodes 56 (FIG. 7) along line 650 to capacitor 54 of the recovery circuit illustrated in FIG. 8. When the voltage, $V_O$, across the capacitor reaches a predetermined level, the transistor 60 is made conductive to transfer the stored energy to the capacitor 62 for addition to the alternator voltage, $V_M$.

For triggering the transistor 60 to effect energy transfer, a comparator 652 is provided for comparing a signal indicative of the capacitor voltage, $V_O$, with a signal indicative of the alternator voltage, $V_M$, and for producing an output signal when the ratio of the capacitor voltage and the alternator voltage exceeds a predetermined value such as, for example, when the capacitor voltage is twice the alternator voltage. A voltage dividing arrangement is provided at each input of the comparator for reducing the input voltages and for setting the operating point of the comparator. As shown, the capacitor voltage, $V_O$, is reduced by voltage dividing resistors 654 and 656 and the alternator voltage, $V_M$, is reduced by voltage dividing resistors 658 and 660. Load resistor 662, which is connected to regulated voltage, $V_R$, is provided for setting the level of the comparator output signal.

When the capacitor voltage reaches a predetermined level such as, for example, twice the alternator voltage, the comparator 652 produces an output signal for making transistor 664 condiuctive and thereby triggering conduction of the transistor 60. The conduction of the transistor 60 causes transfer of the stored energy from the capacitor 54 to the capacitor 62 by way of the inductor 64 and shunt resistor 666 for addition of the stored energy to the alternator output voltage, $V_M$.

In order to protect the transistor 60 from excessive current, a current limiting arrangement is provided, which includes comparator 668 and transistor 670, for interrupting the energy transfer by the transistor 60 when a predetermined current value is exceeded. A reference voltage indicative of the predetermined current limit value is developed at line 672 at one input of the comparator by a reference voltage network comprising resistors 674, 676, 678, 680 and zener diode 682. The reference voltage may be varied by adjusting the adjustable resistor 676. The network is connected to one side of the shunt resistor 666 and has the voltage, $V_O$, across the capacitor 54 supplied thereto. The predetermined voltage developed at the input line 672 is compared with a signal indicative of the voltage at the opposite side of the shunt resistor which is supplied to the other input of the comparator by way of resistor 684.

When the current through the shunt resistor 666 exceeds a predetermined value, the comparator 668 operates to produce an output signal which is supplied through resistor 686 to the base of transistor 688 to cause conduction thereof. The collector of the transistor 688 is connected to the base of transistor 670 by way of resistor 690; thus, conduction of the transistor 688 triggers conduction of the transistor 670 so that the signal being supplied from the comparator 662 is diverted to ground. Therefore, the transistor 664 is made nonconductive to thereby terminate conduction of the transistor 60 and thus, interrupt energy transfer during the high current condition.

Figure 8:
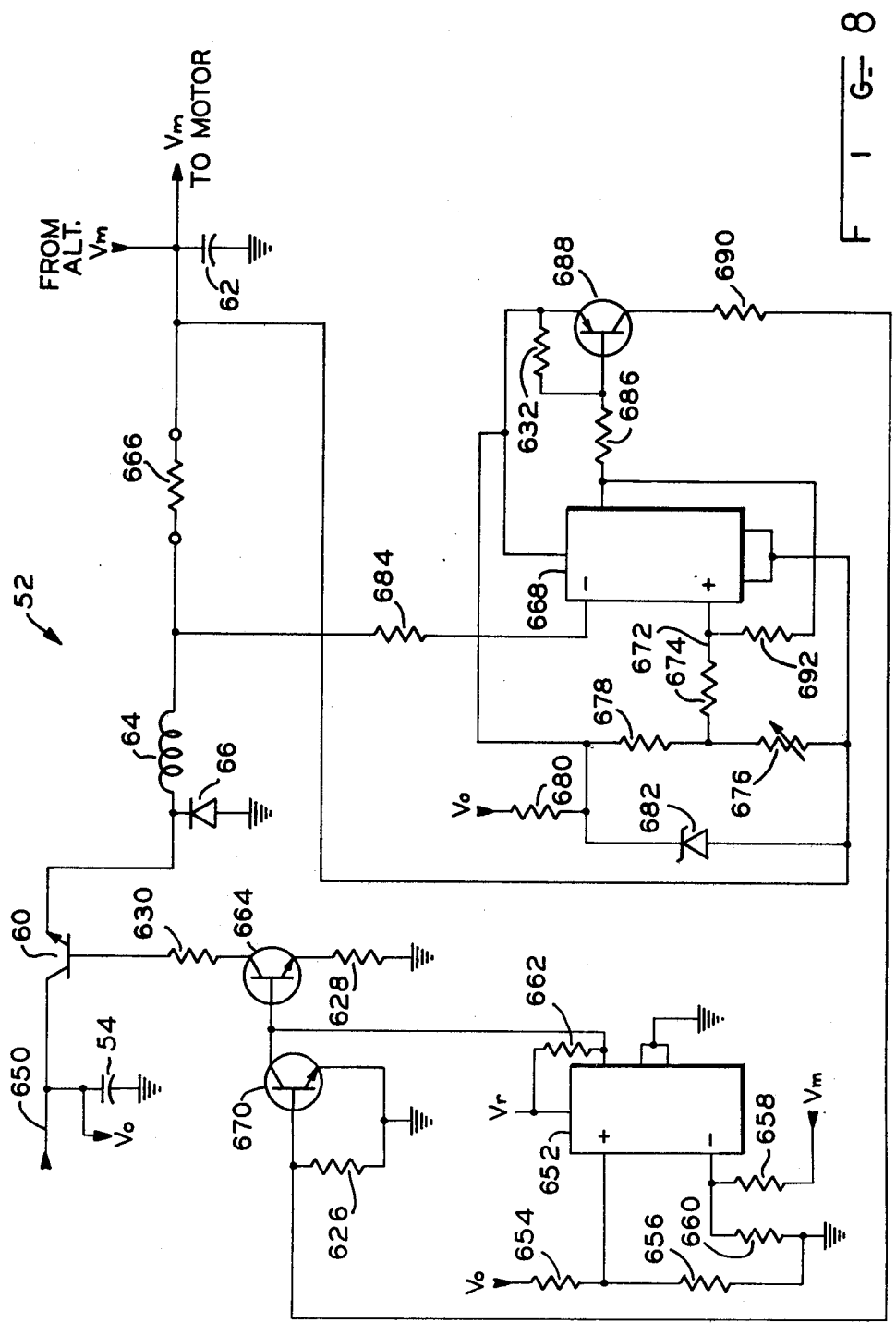
FIG. 8 is an electrical schematic diagram showing details of a recovery circuit illustrated in FIG. 1.
Figure 9:
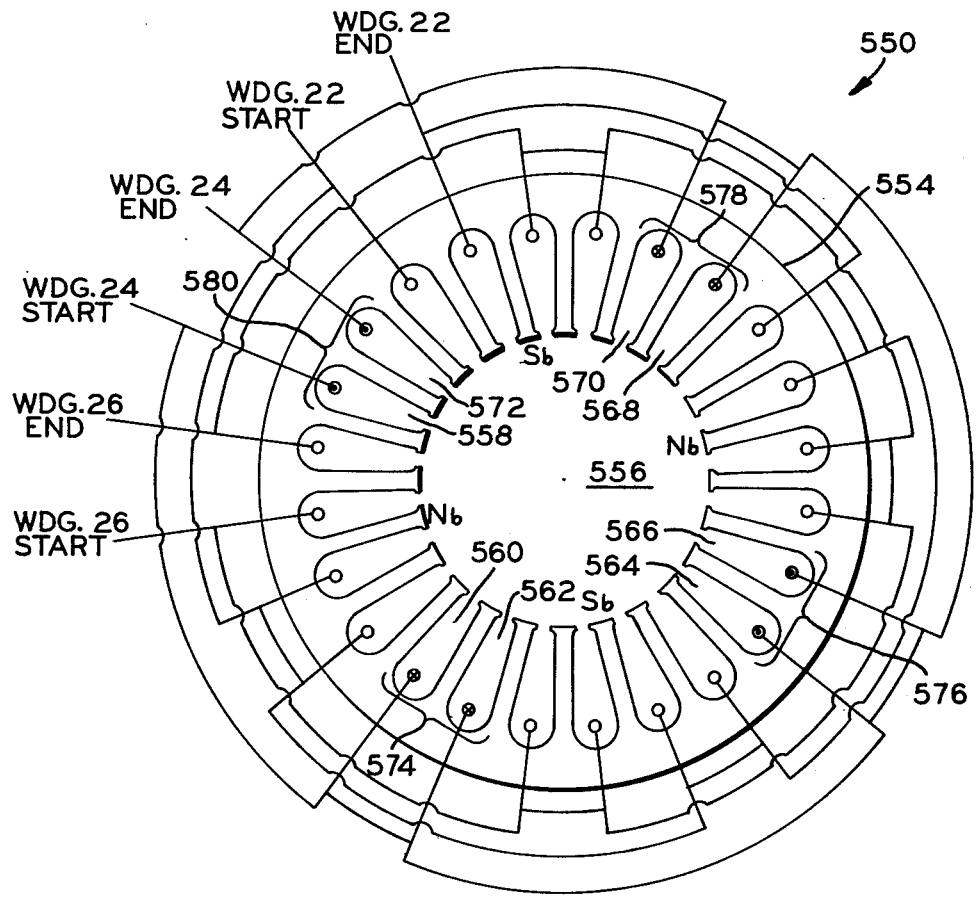
FIG. 9 is a diagrammatic front elevational view of a stationary armature for the three stage brushless DC motor of FIG. 1, diagrammatically illustrating winding details for the three stages of the motor.

FIGS. 9 and 10 illustrate details of a stationary armature 550 and the rotor 552, respectively, of the brushless DC motor. The diagrammatically illustrated winding arrangement of FIG. 9 is substantially identical to the three stage, four pole armature arrangement illustrated in FIG. 29 of my co-pending application Ser. No. 802,484. Referring to FIG. 8, the stationary armature 550 includes a magnetic core 554 having a longitudinal axis (extending into the page) and twenty-four axially extending slots opening into an axially extending bore 556. The armature further includes the three stage windings 22, 24, and 26 with each winding stage comprising four coils of concentric winding turns having side turns thereof disposed in the slots of the core to establish four magnetic poles when energized. For example, the illustrated winding stage 24 has four coils each having a predetermined number of conductor turns with the first coil being disposed in slots 558 and 560, the second coil being disposed in slots 562 and 564, the third coil being disposed in slots 566 and 568, and the fourth coil being disposed in slots 570 and 572. For clarity, only one conductor turn is shown in each slot although each coil of the illustrated armature 550 was formed with fifteen conductor turns. The coils may be wound consecutively or wound separately and then disposed and interconnected so as to produce current flow as indicated ("X" indicating current flow into the page and "." indicating current flow out of the page). As illustrated, the side turns, i.e., the portions of the conductor turns disposed within the slots, of the coils for winding stage 24 create four winding sets 574, 576, 578 and 580. The winding set 574 is disposed in the slots 560 and 562; the winding set 576 is disposed in the slots 564 and 566; the winding set 578 is disposed in the slots 568 and 570; and the winding set 580 is disposed in the slots 572 and 558. The coils of the winding stage 24 have been wound and disposed in the armature slots so that the conductor portions of each winding set will conduct current in the same axial direction as indicated, along the axial length of the core when the winding stage 24 is energized; thus, creating four magnetic poles or two pairs of magnetic poles, $N_b$, $S_b$ as shown. The winding stages 22 and 26 of FIG. 9 are formed in the same manner as described above for winding stage 24, with each having four winding sets with conductor portions conducting current in the same axial direction along the core when energized.

The three stage, four pole armature winding arrangement of FIG. 9 has a winding "spread" of 30 mechanical degrees or 60 electrical degrees. As discussed in my co-pending application, the "spread" is the angular expanse of adjacent core slots that carry the conductors of a given winding stage which instantaneously conduct current in the same axial direction along the axial length of the core. As shown in FIG. 9, a set of winding stage 24 occupies two adjacent slots and all the conductors within that set carry current in the same axial direction along the axial length of the core; thus, the spread is the angular expanse of the two slots occupied by the set which is 60 electrical degrees or 30 mechanical degrees.

In actual construction, the core 554 of the stationary armature 550 was provided with an outer diameter of 3.982 inches and with the bore 556 being 1.922 inches. Each of the 24 slots was provided with a 0.094 inch opening into the bore. The core was provided with an axial or longitudinal length of 1.75 inches. Each of the coils were formed with 15 turns of single stranded aluminum wire having a 0.0718 inch diameter.

FIG. 10 illustrates the rotor 552 of the brushless DC motor. The rotor is provided with a bore 582 therethrough for mounting on a not shown rotor shaft with such shaft being rotatably supported by a conventional not shown bearing means within any not shown housing. The rotor is mounted within the bore 556 of the magnetic core 554 (FIG. 9) for rotation about the longitudinal axis of the stationary armature core. In the illustrated embodiment, the rotor 552 comprises a magnetic steel core 584 having magnet segments 586 disposed on the periphery of the rotor core for producing constant magnetic polar regions which may span, for example, 75 degrees as illustrated. The magnet segments 586 were cobalt samarium magnets, but it will be understood that they could be ceramic or any other type of available magnet material. Each of the magnet segments was provided with an outer arcuate span of 37½ degrees, a thickness of 0.290 inches as measured at the center of the arcuate span and an inner base length of 0.442 inches. Aluminum spacers 588 were provided between each of the pairs of magnet segments with the spacers having a 15 degree outer arcuate span, a thickness of 0.290 inches as measured at the center of the arcuate span and an inner base length of 0.179 inches. The magnet segments, aluminum spacers and rotor core were two inches in axial length with the diameter of the illustrated rotor being 1.882 inches. The magnet segments and aluminum spacers were adhesively bonded to the rotor core and then a fiberglasss tape was wrapped about the periphery of the rotory; however, any suitable means could be utilized to retain the magnet segments.

Figure 11:
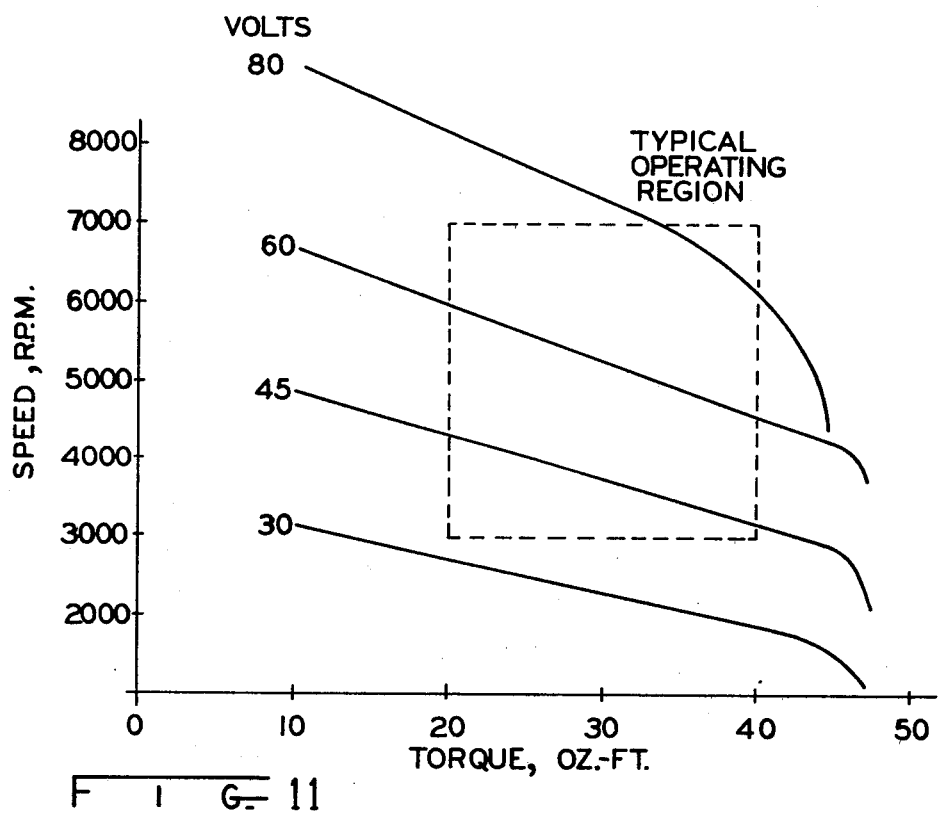
FIG. 11 is a graph of speed versus torque for different operating voltages of a particular brushless DC motor constructed in accordance with the teachings of the present invention.
Figure 12:
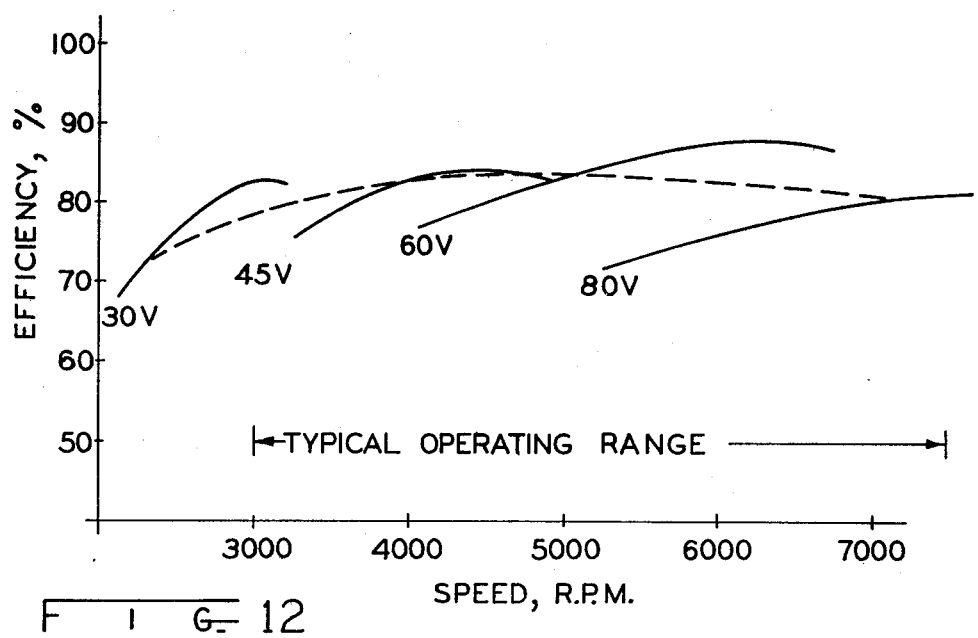
FIG. 12 is a graph of efficiency versus speed for different operating voltages of the particular brushless DC motor and control arrangement having the characteristics illustrated in FIG. 11.

FIGS. 11 and 12 illustrate operating characteristics of a particular brushless DC motor constructed and utilized in accordance with the teachings of the present invention. FIG. 11 is a graph of motor speed in revolutions per minute (rpm) versus the output torque of the motor in ounce-feet for different voltages being applied to the three winding stages of the motor. The enclosed dotted region indicates an anticipated operating region for the particular motor when utilized with a refrigeration system as described herein. FIG. 12 is a graph of the motor efficiency versus the operating speed of the motor for different motor supply voltages ranging from 30 volts to 80 volts. The dotted line illustrates an approximate average motor operating efficiency while the solid lines indicate the actual efficiency as measured for the different applied voltages or energization levels. The efficiency shown in FIG. 12 includes motor losses and losses in the control circuit, but does not include alternator losses or other losses within a refrigeration system. As can be seen, the average efficiency over the operating range of from 3,000 to 7,500 rpm of the motor varied from approximately 79 percent to approximately 84 percent with peak efficiencies up to 88 percent being produced.

Listed below are representative component values or element identification for the foregoing circuits.

TABLE I

| Reference No. | Component |
| --- | --- |
| FIG. 2 | |
| 68 | 10K NTC Thermistor |
| 70, 74 | CA 3160 |
| 72, 100, 600, 604 | 10K |
| 78, 82 | 15K |
| 80 | 10K (adjustable) |
| 84 | 10 MFD |
| 88 | MC 3420 |
| 92 | 20K (adjustable) |
| 94 | 390 ohm |
| 96 | A115D |
| 98 | LM 311 |
| 104 | 4.7K |
| 106, 110 | 8.2K |
| 114 | 22K |
| 602 | 100K |
| 606 | 12K |
| 608 | .33 MFD |
| 610 | 68 ohm |
| 612 | 100 ohm |
| FIG. 3 | |
| 116 | 10K NTC Thermistor |
| 118, 164 | 33K |
| 122, 124, 126, 158 | CA 3160 |
| 128, 132, 160, 196, 198, 222 | 10K |
| 130 | 120K |
| 134, 188 | 10K (adjustable) |
| 136 | 15K |
| 142, 144, 154, 214 | CD 4016 |
| 146 | CD 4011 |
| 156, 166 | 2.2K |
| 162, 190, 220 | LM 311 |
| 167 | 8.2K |
| 170, 172 | TIP 142 |
| 174 | 1 K |
| 176 | 2.7K |
| 178 | A115D |
| 180, 218 | 50K (adjustable) |
| 186 | MC-1741 |
| 200 | 1K (adjustable) |
| 202, 204, 238 | 47K |
| 216 | CD 4001 |
| 226, 230 | 6.8K |
| 228 | 5K (adjustable) |
| 232, 236 | 4.7K |
| 240 | 200K (adjustable) |
| 250 | 39K |
| 252 | 2N3414 |
| 614 | 100K |
| 616 | 180K |
| 618 | 15 megohm |
| FIG. 4 | |
| 242, 286, 292, 296, 300, 304, 306, 326 | CD 4011 |
| 244, 246, 254, 256, 336, 338 | CD 4001 |
| 262, 270, 278, 284, 312, 344, 358 | 10K |
| 264, 272, 314 | 1 megohm |
| 266, 274 | .2 MFD |
| 280 | 2N3414 |
| 282 | 2.7K |
| 308 | 150 MFD |
| 316, 348 | 22K |
| 322, 328, 334 | 330 pf |
| 324, 330, 332 | 33K |
| 340, 354 | 15 MFD |
| 346 | 680K |
| 350 | LM 311 |
| 352, 364, 366 | 12K |
| 360 | PTCR (1K cold-20K hot) |
| 634 | 120K |
| FIG. 5 | |
| 372 | 150K |
| 374 | 270K |
| 376, 378 | .22 MFD |
| 380 | CA 3160 |
| 384, 396 | LM 311 |
| 386, 394, 404 | 10K |
| 390, 400 | 10K (adjustable) |
| 392, 402 | 8.2K |
| 620 | 2.7 megohm |
| 622 | 1 megohm |
| FIG. 6 | |
| 412, 424 | 40K (.01%) |
| 414 | 1K (.01%) |
| 418, 446 | CA 3160 |
| 420, 426, 448, 450 | 10K (.01%) |
| 436 | 1N4148 |
| 438 | .1 MFD |
| 440 | .01 MFD |
| 442 | 1K |
| 452, 468 | 10K (adjustable) |
| 454, 464, 524 | 10K |

TABLE I-continued

| Reference No. | Component |
| --- | --- |
| 456, 492 | CD 4016 |
| 458 | .22 MFD |
| 460 | zener (6.8v) |
| 462 | LM 311 |
| 466 | 8.2K |
| 472 | 5.6K |
| 474 | 820K |
| 476 | .001 MFD |
| 478 | 68K |
| 480, 482, 488, 490, 522, 528, 530 | CD 4001 |
| 484 | .0068 MFD |
| 486 | 100K |
| 494 | 390 ohm |
| 496, 498 | CD 4013 |
| 526 | 33 PF |
| 532 | 56 PF |
| 534 | 39K |
| 538 | D44H5 |
| 540 | zener (8.2v) |
| 542 | 10/2 watt |
| 544 | 470 ohm |
| 546 | 250 MFD (25v) |
| 548 | 200 MFD (25v) |
| FIG. 7 | |
| 500 | CD 4023 |
| 502 | 39K |
| 504 | 33 PF |
| 506, 510 | CD 4049 |
| 508 | CD 4011 |
| 512 | 10K |
| 514 | 2N3414 |
| 516 | D44H8 |
| 518 | 12/5 watt |
| 520 | 22/2 watt |
| 46a, 46b, 48a, 48b, 50a, 50b | 2SD643 |
| 624, 56 | A115D |
| FIG. 8 | |
| 54 | 500 MFD |
| 60 | 2N6213 |
| 62 | 1680 MFD(150v) |
| 64 | 6.7 MH |
| 66 | A115D |
| 626, 656, 660 | 1K |
| 628 | 680 ohm |
| 630 | 4.7K/2W |
| 632 | 3.3K |
| 652, 668 | LM 311 |
| 654 | 39K/1W |
| 658 | 18K/1W |
| 662 | 4.7K |
| 664 | D44R4 |
| 666 | .1 ohm |
| 670 | 2N3414 |
| 674, 678, 684 | 12K |
| 676 | 1K (adjustable) |
| 680 | 2.7K/2W |
| 682 | zener (8.2v) |
| 686 | 15K |
| 688 | D45C12 |
| 690 | 33K |
| 692 | 100K |

The solid state components listed in Table I hereinabove were either RCA, G.E., National, Texas Instruments, Toshiba or Motorola devices. The alternator (Reference No. 28 in FIG. 1) was Leece-Neville No. XA8408. The NTC thermistors and PTCR were made by Veco.

Although particular embodiments have been disclosed and described herein, it will be readily apparent that numerous modifications may be made and still be within the true spirit and scope of the teachings of the present invention. Therefore, it is intended by the appended claims to cover all such modifications which fall within the true spirit and scope of the present invention.

What I claim as new and desire to secure by Letters Patent of the United States is:

1. A brushless DC motor and control arrangement for use with a refrigeration system comprising an evaporator, a compressor for moving a refrigerant through the evaporator, an evaporator fan for moving air about the evaporator for maintaining a desired temperature within a compartment by moving refrigerated air thereto, and wherein said brushless DC motor is coupled to said compressor and comprises a stationary armature having a core and winding means arranged to establish at least two winding stages; said winding means comprising concentric winding turns accommodated by said core and arranged to establish a predetermined number of magnetic poles, and the winding turns of each winding stage having a number of sets of axially extending conductor portions with such number equal to the predetermined number of magnetic poles; the axially extending conductor portions within each given set being disposed in said armature to conduct current instantaneously in a common axial direction along the core thereby contributing to establishment of a magnetic pole when the winding stage containing the given set is energized; a rotor having constant magnetic polar regions equal in number to the predetermined number of poles, said rotor being adapted to rotate in response to the magnetic poles established by the winding turns; a commutation circuit for energizing the windings in a predetermined manner wherein said commutation circuit includes a detector circuit for sensing a back emf signal indicative of the back emf condition of at least one winding, position determining circuit means responsive to the emf signal from the detector circuit for integrating the emf signal to a predetermined value of volt-seconds whereupon the position determining circuit means produces a simulated relative position output signal; means responsive to the simulated relative position output signal from the position determining circuit means for supplying an output signal for energizing a selected one of the winding stages; and said control arrangement further including a regulating means adapted for controlling the supply of energization power to the winding stages; said regulating means comprising means for responding to evaporator temperature and for varying the supply of power to the winding stages to thereby vary the speed of the brushless DC motor and control the flow rate of the refrigerant so as to maintain a selected portion of the evaporator at a first preselected reference temperature; and said regulating means also comprising means for responding to a signal indicative of cooling demand within the compartment for automatically changing the first reference temperature of the selected portion of the evaporator in accordance with the relative cooling demand thereby to cause variance in the temperature of air moved about the evaporator for controlling temperature within the compartment.

2. The brushless DC motor and control arrangement of claim 1 wherein the evaporator fan is a variable speed device, and said signal indicative of relative cooling demand within the compartment comprises a signal indicative of relative speed of the evaporator fan.

3. The brushless DC motor and control arrangement of claim 1 wherein said regulating means includes a current limiting means responsive to the current in the winding stages of the brushless DC motor for controlling the energization level of the winding stages after a predetermined current is reached so as to limit the motor current to the predetermined value.

4. The brushless DC motor and control arrangement of claim 1 wherein said regulating means includes a low speed means responsive to the speed of the motor for inhibiting energization of the winding stages by the power source when the motor speed is less than a predetermined value and for enabling automatic restart of the motor after a predetermined period.

5. The brushless DC motor and control arrangement of claim 1 wherein said regulating circuit further includes an evaporator freeze up control means for responding to evaporator temperature and for inhibiting energization of the winding stages by the power source when the evaporator temperature is less than a predetermined low temperature limit.

6. The brushless DC motor and control arrangement of claim 1 wherein said regulating means includes a high speed means responsive to the speed of the motor for controlling the energization level of the winding stages after a predetermined high speed value has been reached so as to limit motor speed to the predetermined high speed value.

7. The brushless DC motor and control arrangement of claim 1 wherein said regulating means includes means for assuring a minimum energization level for the winding stages of the brushless DC motor.

8. The brushless DC motor and control arrangement of claim 1 wherein said regulating means includes means for limiting the energization level of the winding stages to a predetermined maximum voltage value.

9. The brushless DC motor and control arrangement of claim 1 wherein said regulating means includes means for responding to temperature at a preselected location within the arrangement and for inhibiting energization of the winding stages when a predetermined high temperature value is exceeded.

10. A method of controlling a refrigeration system comprising an evaporator, a compressor for circulating refrigerant through the evaporator, an evaporator fan for moving air about the evaporator to maintain a desired temperature within a compartment, a brushless DC motor coupled to said compressor and having a core with a longitudinal axis and at least two winding stages disposed on said core for producing magnetic fields, a rotor adapted to rotate about the longitudinal axis in response to the magnetic fields produced by the winding stages, and a commutation circuit for sensing the position of the rotor and selectively switching a power source to selectively energize the winding stages in accordance with the relative position of the rotor and winding stages, said method comprising: sensing temperature of the compartment being cooled by the system, comparing said temperature with a desired compartment temperature and varying operating speed of the evaporator fan in accordance with the difference between the sensed temperature and desired temperature; sensing evaporator temperature, comparing the evaporator temperature with a reference temperature, and controlling the power source output in accordance with the difference between the evaporator temperature and the reference temperature, thereby varying the speed of the brushless DC motor whereby the flow rate of refrigerant moved through the evaporator is varied to control operating temperature of the evaporator; automatically varying the reference temperature for the evaporator in accordance with a signal indicative of the evaporator fan speed, thereby changing the temperature of the air being moved by the fan for facilitating control of the compartment temperature at the desired temperature.

11. An improved brushless DC motor control circuit for controlling application of power to winding stages of a brushless DC motor having a stationary armature comprising a core with a longitudinal axis and at least two winding stages disposed on the core to establish magnetic fields, a rotor adapted to rotate about said longitudinal axis in response to the magnetic fields established by said armature, and a commutation circuit for controlling energization of the winding stages in accordance with the relative rotor position of the rotor and winding stages, said control circuit being particularly adapted for use in a refrigeration system comprising a compressor coupled to said brushless DC motor for moving refrigerant through an evaporator and an evaporator fan for moving air about the evaporator so as to maintain a predetermined temperature within a compartment subjected to cooling by the refrigeration system, said brushless DC motor control circuit comprising: evaporator fan control means for responding to temperature within the compartment for varying the speed of the evaporator fan in accordance with differences between the measured compartment temperature and a desired compartment temperature and for producing an output signal indicative of the relative operating speed of the fan motor; a regulating circuit including means for connection to a power source for supplying power to the winding stages, for responding to evaporator temperature and for controlling the output of the power source to thereby vary the speed of the brushless DC motor to cause the evaporator temperature to vary; and said regulating circuit being responsive to the output signal of the fan control means for adjusting the evaporator temperature in accordance with the relative operating speed of the fan motor, whereby the temperature of the air being moved by the evaporator fan is varied to achieve the desired cooling within the compartment.

* * * * *